US012539675B2

(12) United States Patent
Angelini et al.

(10) Patent No.: US 12,539,675 B2
(45) Date of Patent: Feb. 3, 2026

(54) ULTRA-LOW INTERFACIAL TENSION SUPPORT MEDIUM FOR HIGH PRECISION SILICONE 3D PRINTING

(71) Applicant: University of Florida Research Foundation, Inc., Gainesville, FL (US)

(72) Inventors: Thomas E. Angelini, Gainesville, FL (US); Jon P. Dobson, Gainesville, FL (US); Senthilkumar Duraivel, Gainesville, FL (US); Brent S. Sumerlin, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 101 days.

(21) Appl. No.: 18/066,318

(22) Filed: Dec. 15, 2022

(65) Prior Publication Data

US 2023/0119492 A1 Apr. 20, 2023

Related U.S. Application Data

(63) Continuation-in-part of application No. PCT/US2021/037346, filed on Jun. 15, 2021.
(Continued)

(51) Int. Cl.
*B29C 64/40* (2017.01)
*B33Y 10/00* (2015.01)
(Continued)

(52) U.S. Cl.
CPC .............. *B29C 64/40* (2017.08); *B33Y 10/00* (2014.12); *B33Y 70/00* (2014.12); *C09D 5/022* (2013.01);
(Continued)

(58) Field of Classification Search
CPC ......... B29C 64/40; B33Y 10/00; B33Y 70/00; C09D 5/022; C09D 5/027; C09D 183/04; B29K 2083/00
See application file for complete search history.

(56) References Cited

U.S. PATENT DOCUMENTS

| 5,707,939 A | 1/1998 | Patel |
| 6,379,682 B1 | 4/2002 | Tchinnis et al. |

(Continued)

FOREIGN PATENT DOCUMENTS

| EP | 1263392 B1 | 10/2005 |
| WO | 2020082359 A1 | 4/2020 |

OTHER PUBLICATIONS

Parchem ("Dimethicone copolyol") (Year: 2024).*
(Continued)

*Primary Examiner* — Jiangtian Xu
(74) *Attorney, Agent, or Firm* — Thomas| Horstemeyer, LLP

(57) ABSTRACT

In one aspect, the disclosure relates to a support material for 3D printing of soft materials having feature sizes <5 μm that persist over time, methods of 3D printing using the same, and articles that include soft matter constructed using the disclosed methods. In one aspect, the support materials can be jammed inverse emulsions having silicone oils as the continuous phase and glycerol/water mixtures as the dispersed phase. In some aspects, the support materials also include a surfactant. In any of these aspects, the support materials can be optically clear.

18 Claims, 24 Drawing Sheets

(a) CAD model of the scaffold to be printed (b) Sagging in conventional 3D printing (c) Rayleigh instability within jammed medium (d) Using jammed medium similar to ink

Related U.S. Application Data

(60) Provisional application No. 63/039,209, filed on Jun. 15, 2020.

(51) Int. Cl.
*B33Y 70/00* (2020.01)
*C09D 5/02* (2006.01)
*C09D 183/04* (2006.01)
*B29K 83/00* (2006.01)

(52) U.S. Cl.
CPC ........... *C09D 5/027* (2013.01); *C09D 183/04* (2013.01); *B29K 2083/00* (2013.01)

(56) References Cited

U.S. PATENT DOCUMENTS

| | | | |
|---|---|---|---|
| 7,276,553 | B2 | 10/2007 | Garrison et al. |
| 7,378,382 | B2 | 5/2008 | Shikano et al. |
| 7,972,705 | B2 * | 7/2011 | Branlard ............. D06M 15/643 |
| | | | 428/447 |
| 2005/0123689 | A1 | 6/2005 | Branlard et al. |
| 2008/0280797 | A1 * | 11/2008 | Compain ................. A61K 8/86 |
| | | | 510/136 |
| 2011/0147259 | A1 | 6/2011 | Binder et al. |
| 2012/0156148 | A1 | 6/2012 | Shikano et al. |
| 2018/0057682 | A1 | 3/2018 | Angelini et al. |

OTHER PUBLICATIONS

International Search Report and Written Opinion mailed Nov. 22, 2021.
O'Bryan et al., Self-assembled micro-organogels for 3D printing silicone structures, Science 1-23 Advances, vol. 3, May 10, 2017 [retrieved on Oct. 12, 2021]. Retrieved from the Internet: <URL: https://www.science.org/doi/10.1126/sciadv.1602800>. pp. 1-8.

* cited by examiner

ULTRA-LOW INTERFACIAL TENSION SUPPORT MEDIUM FOR HIGH PRECISION SILICONE 3D PRINTING

CROSS REFERENCE TO RELATED APPLICATIONS

This application is a bypass continuation-in-part application of international patent application PCT/US2021/037346 filed on Jun. 15, 2021, which claims the benefit of U.S. Provisional Application No. 63/039,209, filed on Jun. 15, 2020, both of which are incorporated herein by reference in their entireties.

BACKGROUND

Additive manufacturing has allowed the fabrication shapes and structures of plastics, metals and even ceramics that would not otherwise be possible using conventional fabrication techniques. Recent advancements in this field include advanced tissue engineering, bioprinting, and microfluidic device fabrication. One of the biggest limitations of this method is that only materials that solidify or cure upon extrusion can be used. Additionally, sacrificial support is often required when printing structures or where parts of structures being printed are not supported by the preceding layer. Printing into a jammed microgel system has overcome certain problems related to material limitations and the requirement for sacrificial support structures.

Silicone elastomer's resistance to heat, chemical agents, weathering, ozone, moisture, and UV irradiation makes it critical for manufacturing countless products like electronic devices, automobiles, aircraft, and medical devices. Silicone elastomers have been used in medical devices for many years, and burgeoning applications include embedded sensors, flexible electronics, soft robotics, and additive manufacturing. Silicone structures can be fabricated using conventional techniques like molding or advanced techniques like soft-lithography and 3D printing. However, 3D printing with silicone generally results in low-quality products because of numerous challenges created by the interfacial behaviors of silicone pre-elastomer in its liquid state. These challenges can be partially addressed by employing embedding support materials that flow around translating printing nozzles while trapping deposited inks in space, providing stability to printed structures. However, even under such stabilizing conditions, the interfacial tension between printed inks and their support media drives the deformation and breakup of printed structures before they solidify (FIGS. 11A-11B). These disruptive effects could be dramatically reduced by using support materials that are chemically similar to the printed inks they stabilize, reducing interfacial tension (FIG. 11C). To overcome the long-standing barrier of interfacial instability in 3D printing of silicone, there is a critical need to develop support materials that are chemically similar to poly(dimethyl siloxane) (PDMS) inks. Failure to overcome these destabilizing interfacial forces will leave the quality of silicone printing at its currently limited level of performance, making it impossible to fabricate structures having fine details and highly controlled shapes like those routinely achievable when printing with other materials.

The fundamentals of jammed microgel rheology have been thoroughly studied and are fairly well understood. However, interfacial phenomena between jammed microgels and surrounding fluids are less well understood. These interfacial forces play a major role in 3D printing applications using jammed microgels since the interfacial tension between the ink and the support medium can lead to the disintegration of the printed structures over time. To minimize the effects of interfacial tension while leveraging the stability provided by jammed support material, the support material must be chemically similar to the printed ink. Hence, to overcome limitations related to the stability of silicone structures during fabrication processes, support materials that are chemically similar to poly(dimethyl siloxane) (PDMS) should be developed. Furthermore, failure to overcome destabilizing interfacial forces will continue to limit the printable resolution of silicone printing, making it impossible to fabricate structures having intricate details. These fabricated structures would, ideally, have applications in personalized implants, lab-on-a-chip devices, tissue/organ-on-a-chip devices, point-of-care devices, biological machines, and other medical applications.

Despite advances in 3D printing of soft material, there is still a scarcity of inks and support materials that allow for the fabrication of 3D printed structures having low surface roughness and intricate details that persist over a long period of time. These needs and other needs are satisfied by the present disclosure.

SUMMARY

In accordance with the purpose(s) of the present disclosure, as embodied and broadly described herein, the disclosure, in one aspect, relates to a support material for 3D printing of soft materials having feature sizes <5 µm that persist over time, methods of 3D printing using the same, and articles that include soft matter constructed using the disclosed methods. In one aspect, the support materials can be jammed inverse emulsions having silicone oils as the continuous phase and glycerol/water mixtures as the dispersed phase. In some aspects, the support materials also include a surfactant. In any of these aspects, the support materials can be optically clear.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3A shows shear modulus measurements through small amplitude frequency sweeps indicate that pure triblock and 50:50 blend solutions exhibit solid-like behavior over long time scales, while a pure diblock system will behave like a viscous fluid. FIG. 3B shows unidirectional shear rate sweep measurements are performed to measure the yield stress of the block copolymer systems. FIG. 3C shows thixotropic time measurements of the 50:50 blend, indicating the recovery of solid-like rheological properties within 1 s of removal of applied stress. FIG. 3D shows microscopic images taken with phase contrast illumination, illustrating the presence of microgels on the order of 2-4 μm in diameter. These results demonstrate that the properties of microgel systems can be assessed using known techniques; improved properties of the present supports based on inverse emulsions can be seen when these types of measurements are performed thereupon.

FIG. 4A shows model trachea implants printed into jammed microgel supports using an RTV silicone. After curing, printed structures were removed from the support material and handled. FIG. 4B shows cross-sectional views of model trachea, demonstrating the ability to print structures with wall thicknesses of 400 μm. FIGS. 4C-4D show silicone scaffolds printed with sinusoidal wave patterns in the x-y and x-z directions, demonstrating the ability to print structures with 250 μm feature sizes. FIGS. 4E-4G show macroscopic images of a perfusable tubular network printed into a micro-organogel support. In one aspect, the jammed inverse emulsion supports disclosed herein can be used in the printing of these and other structures while offering improvements in feature size, surface roughness, and stability of features over time.

FIG. 5A shows small amplitude oscillatory frequency sweeps are used to determine the shear elastic moduli, G', and viscous moduli, G", with increasing volume fraction, $\phi$, for samples prepared at a single homogenization rate, $\omega$, in a continuous phase of silicone oil having a viscosity, $\eta$. FIG. 5B shows that to determine the yield stress of these samples, unidirectional shear rate sweeps are performed; lines passing through data-points are fits of the Herschel-Bulkley model. FIG. 5C shows the storage modulus at a frequency of f=0.1 Hz scales approximately quadratically above a minimally-packed volume fraction of $\phi_0$=0.649. FIG. 5D shows G' from samples prepared using the same continuous phase but with different homogenization rates collapse onto the same curve when re-scaled by the mean droplet radius, a, and plotted versus the volume fraction above close-packing, $\phi$-$\phi_0$, scaling approximately like $(\phi-\phi_0)^2$. FIG. 5E shows that, for a given volume fraction and homogenization rate, the rescaled modulus decreases with increasing viscosity of the silicone oil continuous phase, which likely arises from the different oils exhibiting different levels of interfacial tension against the aqueous phase. FIG. 5F shows a plot of the yield stress versus G' for emulsions prepared at different volume fractions, homogenization rates, and continuous phase viscosities reveals that samples of all combinations lay close to a universal scaling curve given by $\sigma_y$=0.005$(G')^{1.36}$.

FIG. 7A shows measurement of printed feature radius with brightfield microscopy, varying the translation speed, v, of the printing nozzle and the ink deposition rate, Q (left: intensity-inverted images shown). These images are averaged along the x-axis, yielding an intensity profile across each feature. A Gaussian function is fit to the intensity profile to determine the radius of the printed line (right). FIG. 7B shows feature radius of the printed silicone is controllable and can be predicted from a fluid continuity equation with no fitting parameters. Stable silicone features as small as 4 μm in radius were printed.

FIG. 11A shows high interfacial tension destabilizes 3D printed features, driving them to break into spherical droplets; FIG. 11B shows low interfacial tension provides some stability but severely limits the minimum stable feature size; and FIG. 11C shows ultra-low interfacial tension, removing the limits on the minimum stable feature size. FIG. 11D shows silicone-based inks break into droplets when printed into support materials made from aqueous microgels. FIG. 11E shows digitally isolating a droplet from the support and examining it from different angles, the droplet appears nearly spherical and exhibits a smooth surface. FIG. 11F shows that, by contrast, the silicone-based ink remains continuous and retains its shape, indefinitely, after printing into a silicone-based support material. FIG. 11G shows viewing the printed feature from different angles, it exhibits roughness with a characteristic length-scale of the microparticles comprising the support material, facilitated by ultra-low interfacial tension.

FIG. 12A shows brain aneurysm models for surgical simulations comprise complex, interconnected, hollow tubes with intricate details. FIG. 12B is a photograph of the aneurysm model being printed into the disclosed support material, demonstrating the process. FIG. 12C shows CT imaging of the 3D printed model within the printing container, indicating the complexity of the printed aneurysm. FIG. 12D shows slices through the CT scan showing that the printed structure exhibits the hollow channels of the patient's neurovasculature. FIGS. 12E-12F show the printed structure overlays well with the patient's neurovasculature, and quantitative error analysis demonstrates agreement between the two. FIGS. 12G-12H show a model tricuspid aortic heart valve designed using the geometric measurements of the native heart valve. FIG. 12I shows a silicone heart valve model is printed in a single seamless trajectory with a wall thickness of 250 microns within the disclosed support medium and cured under a UV lamp. FIGS. 12J-12K show that, once cured and washed, the valve model is robust enough to be coupled with a water supply, simulating transvalvular flow of the cardiac cycle. The thin leaflets of the valve are observed to open and close during the systolic and diastolic flow of the simulation.

FIGS. 13A-13B show silicone tensile specimens are subject to unidirectional tensile stress and are stretched to failure. FIG. 13C shows tensile stress-strain curves of the specimens printed with their features oriented parallel and perpendicular to the tensile force show linear stress-strain relationships at low strains and exhibit an elastic modulus of 28 kPa. The printed specimens fail near 1000% strain. FIGS. 13D-13E show surface profiles of the printed silicone heart valves exhibit micro-roughness with an RMS value of 5.5 µm, likely determined by the emulsion droplet radius and the ultra-low interfacial tension with the disclosed support material.

FIG. 14A shows fluorescence microscopic imaging of the emulsion droplets are collected to measure the statistical distribution of droplet sizes. FIG. 14B shows droplet size distributions follow log-normal statistics with smaller average droplet sizes arising at higher volume fractions, ϕ. FIG. 14C shows measurements of the characteristic droplet radii, α, prepared at different homogenization rates, ω, collapse when the viscous shear-stress during homogenization is taken into account (η is the silicone oil viscosity).

Figures 1A, 1B, 1C, 1D:
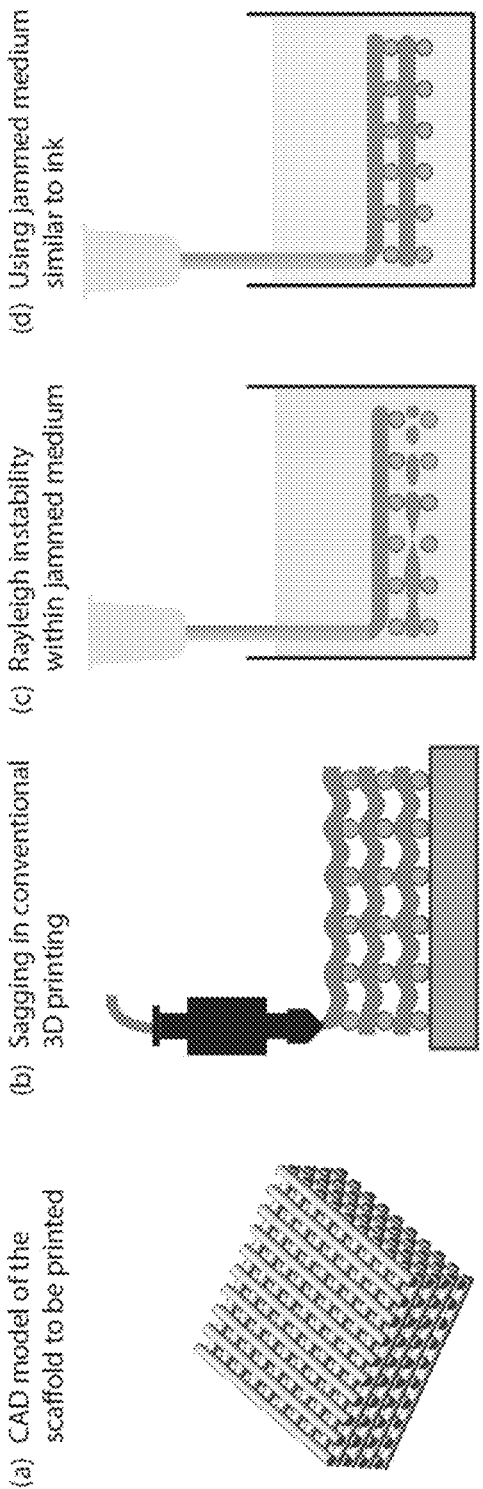
FIG. 1A shows a CAD graphic of a model scaffold to be 3D printed.
FIG. 1B shows that the conventional method of 3D printing will not be effective for printing soft matter or liquid ink, as the unsupported structures will sag and the final structure deviates from the coded structure.
FIG. 1C shows leveraging jammed medium for 3D printing soft matter eliminates sagging by trapping the ink in space, but the interfacial tension between the support medium and the ink will cause the printed structures to break up overtime.
FIG. 1D shows that by employing a jammed medium similar to that of the ink, interfacial instability-related breakup of the printed features can be avoided, leading to indefinitely stable structures.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Disclosed herein is a method for 3D printing precise and intricately detailed structures made from PDMS that leverages a support material having negligible interfacial tension against silicone inks. In one aspect, the disclosed support material is a packed inverse emulsion composed of aqueous droplets in a continuum of silicone oil. The ultra-low interfacial tension between the support material and PDMS inks enables the printing of extremely fine features having radii as small as 4 µm. In another aspect, high performance printing is achieved by tuning the elasticity and flow properties of this support material, fabricating complicated shapes like brain aneurysm models and functional tri-leaflet heart valves. In a further aspect, the disclosed technique does not require specialized inks, employing several different commercially available PDMS formulations to print various structures. In one aspect, printed structures constructed using the disclosed methods and materials are more extensible and as robust as their molded counterparts. In a still further aspect, the disclosed 3D printed structures have a smooth surface finish at the macro-scale and micro-scale roughness facilitated by the low interfacial tension between PDMS inks and the disclosed support medium.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by," "comprising," "comprises," "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a silicone oil," "a surfactant," or "an ink," include, but are not limited to, mixtures of two or more such silicone oils, surfactants, or inks, and the like.

A "scaffold" as used herein refers to a structure useful for providing support to inks during 3D printing. A scaffold is typically three-dimensional and includes solid structures upon which inks can be deposited, as well as open spaces. Scaffolds for 3D printed tissues typically include biocompatible materials (FIG. 1A).

"Sagging" refers to deformation of areas of 3D printed inks caused by gravity or other forces when the areas are unsupported by a scaffold such as, for example, when the inks are printed over an open space between solid structures in a scaffold (FIG. 1B).

Figures 2A, 2B, 2C:
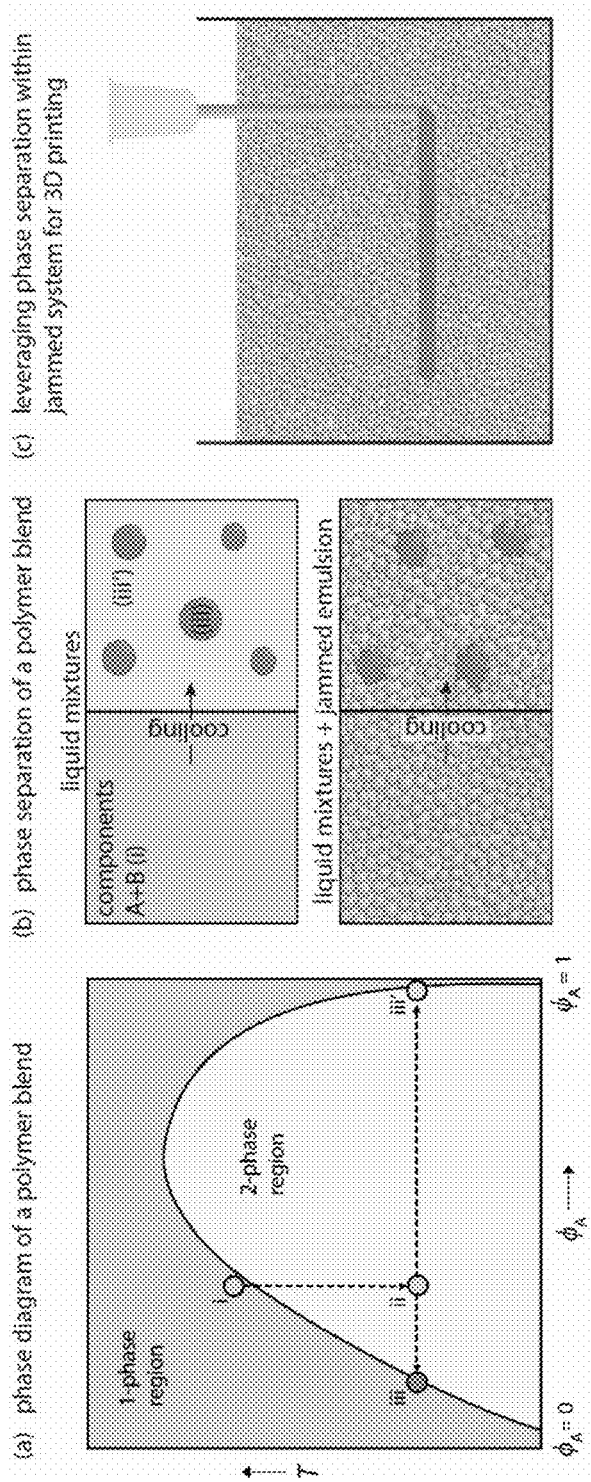
FIG. 2A shows a phase diagram of a typical polymer blend with an upper critical solution temperature (UCST). Point (i) on the phase diagram denotes a stable phase of the two components. Upon quenching to point (ii), the system spontaneously phase separates into two phases, the component B rich phase (iii), and the component A rich phase (iii').
FIG. 2B shows a schematic of phase separation of the polymer blend into a continuous phase rich in component A and a droplet phase rich in component B. However, under jamming, the size, shape, and distribution of the droplet phase is controlled by the yield stress of the jammed system.
FIG. 2C shows that phase separation within a jammed system can be leveraged to be used as a 3D printing technique for fabricating very fine structures.

As used herein, "jammed medium" refers to a medium, such as a microgel or inverse emulsion, in which inks can be 3D printed. The jammed medium provides support for the 3D printed structure without the need for a scaffold. In one aspect, a moving injection nozzle can follow any 3D path desired and can locally shear the jammed medium, leading to temporary fluidization at the point of injection (FIG. 2C). Further in this aspect, ink can be deposited and the injection nozzle then moves away from the deposition site. When the nozzle has left, the surrounding jammed medium rapidly moves back into place, trapping the injected material in space and eliminating the sagging problems that accompany use of traditional scaffolds (FIGS. 1C-1D).

Figures 3A, 3B:
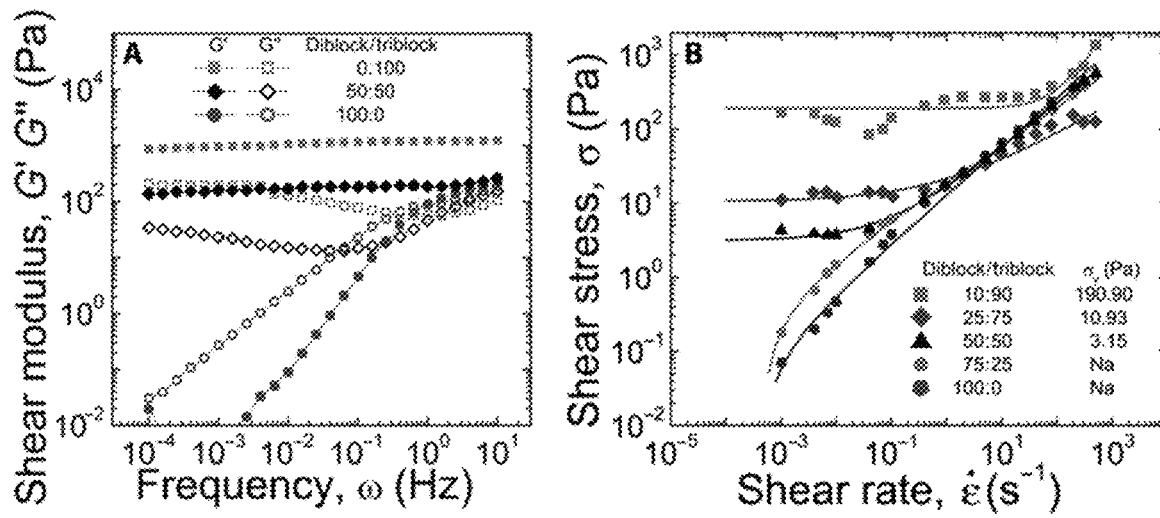
FIGS. 3A-3D shows rheological characterization of self-assembled microgels.

"Shear stress" is the component of stress coplanar with the cross section of a material and, as used herein, is primarily caused by friction among fluid particles due to the viscosity of the bulk fluid. Shear stress tends to cause a material to deform by slipping along a plane parallel to the stress (FIG. 3B).

As used herein, "shear modulus," typically represented by G, describes a material's response to shear stress. A material having a large shear modulus is rigid and a large force is required to deform the material, while a material with a smaller shear modulus is easier to deform (FIG. 3A).

Figures 3C, 3D:
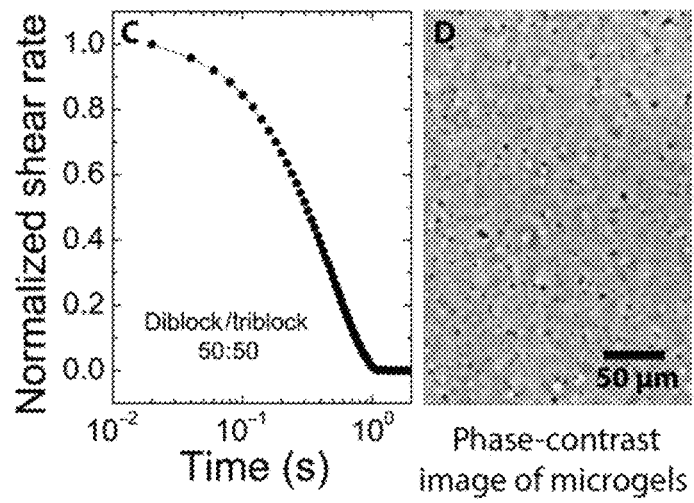
Figures 4A, 4B, 4C, 4D, 4E, 4F, 4G:
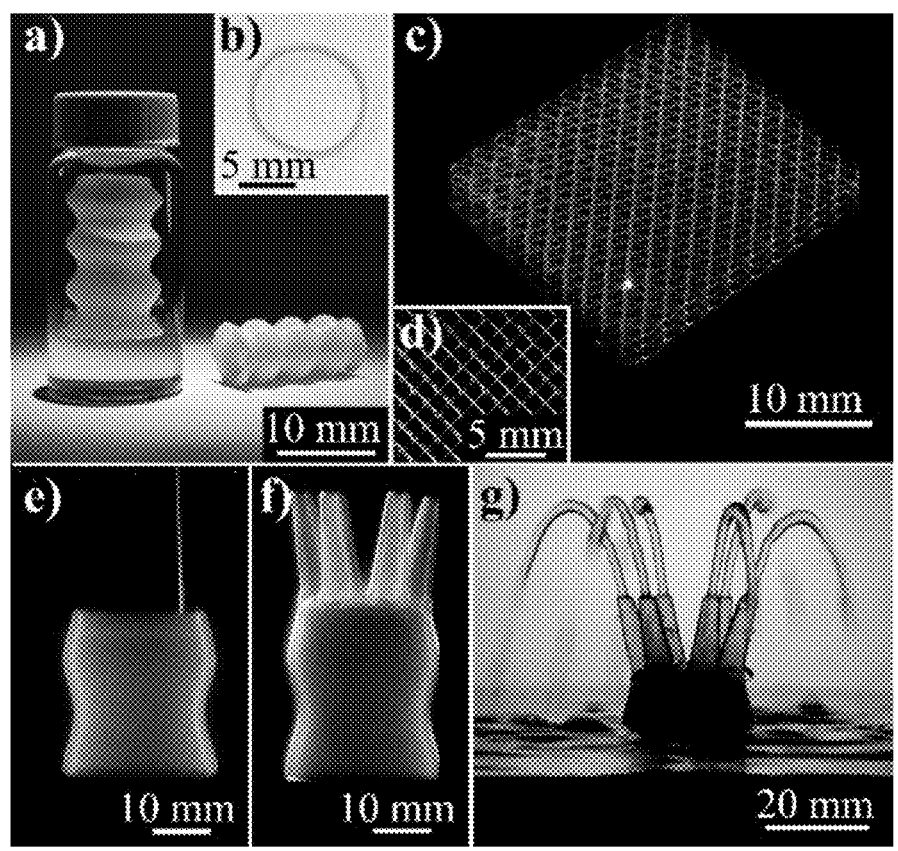
FIGS. 4A-4G show a 3D printed silicone structure in self-assembled micro-organogels.

When one layer of a material passes over an adjacent layer, the rate of change of the velocity at which this occurs is referred to as "shear rate." In one aspect, shear rate is the rate at which a progressive shearing deformation is applied to the material (FIG. 3C).

"Yield stress," meanwhile, is a property of a material that can be used to determine the upper limit of forces that can be applied without permanently deforming the material. In one aspect, yield stress refers to the point at which a material begins to deform in a plastic manner.

As used herein, "storage modulus" is a measure of the stored energy in a material or how much energy must be applied to a material in order to cause a distortion. In one aspect, storage modulus represents the elastic response of a material.

A "microgel" is a system of crosslinked soft particles having a three-dimensional network structure and incorporating a liquid phase. A microgel is typically swollen when in solvent and its properties can be tuned based on chemical identity of crosslinked particles as well as external stimuli including, but not limited to, pH, temperature, and the like. In one aspect, disclosed herein are jammed microgels useful as support media for 3D printing of soft materials. Meanwhile, a "micro-organogel" is a microgel in which the liquid phase is an organic solvent.

An "emulsion" is a mixture of two or more liquids that are immiscible; one of the liquids (the "dispersed phase" or "droplet phase") is dispersed as droplets throughout the other liquid (the "continuous phase"). A "normal emulsion" is one in which water is the continuous phase and oil is the dispersed phase and an "inverse emulsion" is one in which oil is the continuous phase and water is the dispersed phase (FIG. 2B). In some aspects, a surfactant or emulsifying agent and/or a stabilizer is also present.

As used herein, "volume fraction" is that portion of the total emulsion volume occupied by the phase in question. For example, in an oil in water normal emulsion, if 20 mL of oil are present in a 100 mL emulsion, the volume fraction is 20%.

"Upper critical solution temperature" or UCST is a temperature above which the components of a mixture are miscible in all proportions (FIG. 2A).

"Interfacial tension" is typically measured in mN/m and refers to the attraction between the molecules at the interface of two fluids (e.g., between the surface of a droplet and the continuous phase of an emulsion, or between a support material and an ink that is 3D printed on the support material). When the two fluids are immiscible, high interfacial tension results in a minimization of the surface area of contact, thus driving the formation of emulsions, micelles, and the like.

A "coded structure" as used herein refers to the designed structure that would be produced if a 3D printer were to operate perfectly. A "printed structure," meanwhile, refers to the structure that is actually produced using real-world materials. An ideal printed structure would match the coded structure. "Print accuracy" is a measure or reflection of the overlap between the printed structure and the coded structure.

"Surface smoothness" and "surface roughness" as used herein refer to variations in the surface topology of a 3D printed article. Surface roughness may be a result of artifacts from layering, low process resolution, or incompatibility of materials. In one aspect, the 3D printed structures disclosed herein have enhanced surface smoothness.

Figure 10:
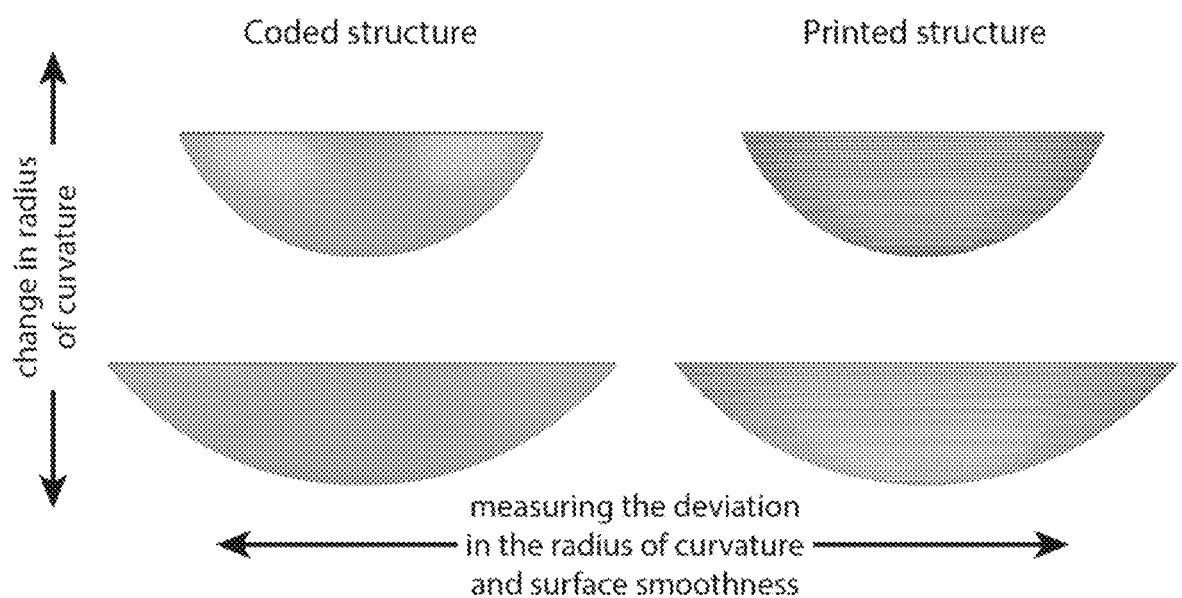
FIG. 10 shows a schematic of spherical segments with different radii of curvature to be printed. Print accuracy is measured as deviation of printed curvature from coded curvature. Print variability is measured as deviation in surface roughness of the printed structure relative to the coded structure.

"Radius of curvature" as used herein refers to the radius of the circular arc that best approximates a given curve. In one aspect, accuracy and variability in printing methods can be assessed by comparing the radius of curvature of a printed structure to the radius of curvature of its corresponding coded structure (FIG. 10).

"Fine structure" as used herein refers to programmed features on the surface of a 3D printed object, wherein the features have a size as small as about 4 µm. In some aspects, the methods and compositions disclosed herein are capable of generating 3D printed objects with fine structures that do not disintegrate over time. Without wishing to be bound by theory, fine structures can be preserved in the disclosed methods due to the low interfacial tension between the continuous phase and the inks employed in the processes disclosed herein.

"Flow rate" refers to the rate (in µL/h) at which ink is deposited from a printing nozzle into the support media disclosed herein. "Translational velocity," meanwhile, is typically measured in mm/s and refers to the speed at which the printing nozzle moves through the support media disclosed herein.

The "spinning drop method" is useful for measuring interfacial tension. In this method, a rotating horizontal tube containing a dense fluid and a drop of a less dense fluid. The rotation of the tube creates a centrifugal force towards the tube walls, the drop deforms into an elongated shape with elongation stopping when the interfacial tension and centrifugal force are of equal magnitude.

As used herein, "self-assembly" refers to the formation of an organized structure due to local interactions among the components of a disordered system, without external influences.

"Room-temperature-vulcanizing silicone" (RTV silicone) is a type of silicone that cures at room temperature and can be made of one or two components and available in a variety of hardnesses. RTV silicones are typically cured with a catalyst.

"Soft matter" is matter that can be easily deformed by either external forces or, in some cases, thermal fluctuations. Examples of soft matter include, but are not limited to, certain polymers, colloids, surfactants, liquid crystals, microgels, emulsions, and the like. In one aspect, disclosed herein is a support medium for 3D printing of soft matter. 3D printed structures of soft matter can be seen in FIGS. 4A-4G.

"Ink" as used herein is the material extruded by a 3D printer and may include various plastics (acrylonitrile butadiene styrene or ABS, polylactic acid or PLA, nylon, etc.), conductive materials, carbon fibers, and other materials. In one aspect, disclosed herein are silicone inks for 3D printing.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y.' The range can also be expressed as an upper limit, e.g. 'about x, y, z, or less' and should be interpreted to include the specific ranges of 'about x,' 'about y', and 'about z' as well as the ranges of 'less than x', less than y', and 'less than z'. Likewise, the phrase 'about x, y, z, or greater' should be interpreted to include the specific ranges of 'about x,' 'about y,' and 'about z' as well as the ranges of 'greater than x,' greater than y,' and 'greater than z.' In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a surfactant refers to an amount that is sufficient to achieve the desired improvement in the property modulated by the formulation component, e.g. achieving the formation of a stable inverse emulsion. The specific level in terms of wt % in a composition required as an effective amount will depend upon a variety of factors including the amount and type of silicone oil in the continuous phase and ratios of water and glycerol in the dispersed phase.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

Support Material for 3D Printing

In one aspect, disclosed herein is a support material for 3D printing of soft material. In a further aspect, the support material can be an emulsion or an inverse emulsion. In a further aspect, when the support material is an inverse emulsion, the inverse emulsion includes a continuous phase and a dispersed phase. In any of these aspects, the support material can be a jammed medium.

In a further aspect, the soft material to be printed can be a silicone. In still another aspect, the continuous phase can be a silicone oil including, but not limited to, poly(dimethylsiloxane) (PDMS), poly(methylphenylsiloxane) (PMPS), or a combination thereof. In a further aspect, the silicone oil can be from about 0.1 to about 0.9 wt % PDMS, or can be about 0.1, 0.15, 0.2, 0.25, 0.3, 0.35, 0.4, 0.45, 0.5, 0.55, 0.6, 0.65, 0.7, 0.75, 0.8, 0.85, or about 0.9 wt % PDMS, or a combination of any of the foregoing values, or a range encompassing any of the foregoing values. In another aspect, the silicone oil can be from about 0.1 to about 0.9 wt % PMPS, or can be about 0.1, 0.15, 0.2, 0.25, 0.3, 0.35, 0.4, 0.45, 0.5, 0.55, 0.6, 0.65, 0.7, 0.75, 0.8, 0.85, or about 0.9 wt % PMPS, or a combination of any of the foregoing values, or a range encompassing any of the foregoing values. In any of these aspects, the silicone oil can have a viscosity of from about 5 cSt to about 1000 cSt, or of about 5, 10, 50, 100, 150, 200, 250, 300, 350, 400, 450, 500, 550, 600, 650, 700, 750, 800, 850, 900, 950, or about 1000 cSt, or a combination of any of the foregoing values, or a range encompassing any of the foregoing values. In one aspect, the silicone oil has a viscosity of from about 10 to about 100 cSt. In another aspect the silicone oil can have a molecular weight of from about 950 g/mol to about 28,000 g/mol, or from about 1250 g/mol to about 5970 g/mol, or of about 950, 1000, 1500, 2000, 2500, 3000, 3500, 4000, 4500, 5000, 5500, 6000, 6500, 7000, 7500, 8000, 8500, 9000, 9500, 10,000, 11,000, 12,000, 13,000, 14,000, 15,000, 16,000, 17,000, 18,000, 19,000, 20,000, 21,000, 22,000, 23,000, 24,000, 25,000, 26,000, 27,000, or about 28,000 g/mol, or a combination of any of the foregoing values, or a range encompassing any of the foregoing values. In some aspects, when the silicone oil is dissolved in a low viscosity solvent (e.g., about 1250 g/mol), the molecular weight of the silicone oil can have a molecular weight of up to 62,700 g/mol.

In some aspects, the continuous phase can be or include a fluorocarbon oil. In a further aspect, the fluorocarbon oil can be a C5-C18 perfluoro compound such as, for example, the compound having CAS number 86508-42-1 and marketed as FLUORINERT™ FC-40 or FLUORINERT™ FC-770 (3M Company).

In still another aspect, the dispersed phase of the inverse emulsion can include water, glycerol, or a combination thereof, in any proportion from 100% glycerol and 0% water to 0% glycerol and 100% water. In one aspect, the dispersed phase of the inverse emulsion includes glycerol and water in a ratio of 100:0, 90:10, 80:20, 70:30, 60:40, 50:50, 40:60, 30:70, 20:80, 10:90, or 0:100, or a combination of any of the foregoing values, or a range encompassing any of the foregoing values. In one aspect, the dispersed phase of the inverse emulsion includes 50% glycerol and 50% water. In another aspect, the dispersed phase of the inverse emulsion includes 51% glycerol and 49% water. In some aspects, ratios of glycerol and water that diverge from 50:50 or 51:49 may have reduced transparency.

In any of these aspects, the dispersed phase and the continuous phase have the same refractive index. Further in this aspect, the support material can be optically clear.

In one aspect, the inverse emulsion includes a volume fraction of the dispersed phase of from about 0.64 to about 0.85, or of about 0.64, 0.65, 0.675, 0.70, 0.725, 0.75, 0.775, 0.8, 0.825, or about 0.85, or a combination of any of the foregoing values, or a range encompassing any of the foregoing values.

In some aspects, the inverse emulsion includes a surfactant. In one aspect, the surfactant includes cyclopentasiloxane and dimethicone copolyol. In one aspect, the dimethicone copolyol can be PEG/PPG-18/18 dimethicone or another dimethicone copolyol (DOW CORNING® 5225 Formulation Aid). In another aspect, the surfactant can be lauryl PEG/PPG18/18 methicone (DOW CORNING® 5200 Formulation Aid), cyclopentasiloxane and PEG-12 dimethicone crosspolymer (DOW CORNING® 9011 Silicone Elastomer Blend), cyclapentasiloxane and PEG/PPG-19/19 dimethicone (DOW CORNING® BY-11-030), PEG/PPG-19/19 dimethicone and C13-16 isoparaffin and C10/13 isoparaffin (DOW CORNING® BY-25-337), PEG-10 dimethicone (DOW CORNING® ES-5612 Formulation Aid), bis-isobutyl PEG/PPG-10/7/dimethicone copolymer (DOW CORNING® FZ-2233), dimethicone and PEG/PPG-18/18 dimethicone (DOW CORNING® ES-5226 DM Formulation Aid), dimethicone and PEG/PPG-18/18 dimethicone (DOW CORNING® ES-5227 DM Formulation Aid), lauryl PEG-10 tris(trimethylsiloxy)silylethyl dimethicone (DOW CORNING® ES-5300 Formulation Aid), cetyl diglyceryl tris(trimethylsiloxy)silylethyl dimethicone (DOW CORNING® ES-5600 Silicone Glycerol Emulsifier), PEG-12 dimethicone (XIAMETER® OFX-5329 Fluid or DOW CORNING® ES-5373 Low Odor Formulation Aid), or a similar surfactant.

In any of the above aspects, the inverse emulsion has a yield stress of from about 0.1 to 100 Pa, or of from about 1 to 20 Pa, or of about 5 Pa. In another aspect, the yield stress can be about 0.1, 1, 2, 3, 4, 5, 6, 7, 8, 9, 10, 11, 12, 13, 14, 15, 16, 17, 18, 19, 20, 21, 22, 23, 24, 25, 30, 40, 50, 60, 70, 80, 90, or about 100 Pa, or a combination of any of the foregoing values, or a range encompassing any of the foregoing values.

Method for 3D Printing Soft Matter

In one aspect, disclosed herein is a method for 3D printing soft matter. In a further aspect, the method includes injecting an ink into the support material disclosed herein. In some aspects, the ink can be PDMS or PMPS. In a further aspect, the ink can be UV curable. In another aspect, the ink can be curable at room temperature, or can be light curable, or can be cured at an elevated temperature. In some aspects, the ink can include other polymers or resins such as, for example, acetate, vinyl, acrylate, or epoxy polymers or resins. In yet another aspect, room-temperature-vulcanizing (RTV) silicones (e.g., SYLGARD™ 184 from Dow Chemical, Inc.; PLATSIL® platinum curing silicone rubbers from Polytek Development Corp., SMOOTH-ON tin cure and platinum cure silicone rubbers from SMOOTH-ON corporation, and the like), water-curable silicone sealants, can be used to formulate inks useful herein. In another aspect, polyvinyl alcohol (PVA), polyethylene glycol (PEG) and conjugated PEGs, poly(N-isopropylacrylamide) (PNIPAM), 4-(hydroxymethyl) phenoxyacetic acid resins (HMPA), starch and starch derivatives, cellulose and cellulose derivatives, and/or other polysaccharides can be used to formulate inks useful herein.

In one aspect, the ink can be injected into the support material with a deposition rate of from about 10 to about 10,000 µL/h, or from about 100 to 100 µL/h, or at about 10, 100, 500, 1000, 1500, 2000, 2500, 3000, 3500, 4000, 4500, 5000, 5500, 6000, 6500, 7000, 7500, 8000, 8500, 9000, 9500, or about 10,000 µL/h, or a combination of any of the foregoing values, or a range encompassing any of the foregoing values. In another aspect, the ink can be injected into the support material with a translational velocity of from about 0.01 to about 20 mm/s, or of about 10 to 10 mm/s, or at about 0.01, 0.05, 1, 1.5, 2, 3, 4, 5, 6, 7, 8, 9, 10, 11, 12, 13, 14, 15, 16, 17, 18, 19, or about 20 mm/s, or a combination of any of the foregoing values, or a range encompassing any of the foregoing values.

In still another aspect, the interfacial tension between the support material and the ink is between about 0.1 and about 10 mN/m, or is about 0.1, 0.5, 1, 1.5, 2, 2.5, 3, 3.5, 4, 4.5, 5, 5.5, 6, 6.5, 7, 7.5, 8, 8.5, 9, 9.5, or about 10 mN/m, or is about 3.4 mN/m.

Soft Matter Articles

In one aspect, disclosed herein are articles comprising soft matter produced by the methods disclosed herein. In a further aspect, the soft matter has a minimum stable feature size of from about 4 to about 80 µm, or of about 4, 5, 6, 7, 8, 9, 10, 15, 20, 25, 30, 35, 40, 45, 50, 55, 60, 65, 70, 75, or about 80 µm, or a combination of any of the foregoing values, or a range encompassing any of the foregoing values. In one aspect, the minimum stable feature size is about 4.3 µm.

In one aspect, the article can be a model organ, tissue on a chip, lab on a chip, medical implant, or similar device. In one aspect, the soft matter and article are biocompatible. In another aspect, the article can be a point of care implant such as, for example, an ear fitting for a hearing aid, a nasal fitting for a respiratory aid or sleep apnea device, custom vasculature implants, a custom ostomy seal, or a similar device.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Aspects

The present disclosure can be described in accordance with the following numbered Aspects, which should not be confused with the claims.

Aspect 1. A support material for 3D printing of soft material, the support material comprising an inverse emulsion, wherein the inverse emulsion comprises a continuous phase and a dispersed phase.

Aspect 2. The support material of aspect 1, wherein the soft material comprises silicone.

Aspect 3. The support material of aspect 1 or 2, wherein the continuous phase comprises a silicone oil.

Aspect 4. The support material of aspect 3, wherein the silicone oil comprises poly(dimethylsiloxane), poly(methylphenylsiloxane), or a combination thereof.

Aspect 5. The support material of aspect 3, wherein the silicone oil has a molecular weight of from about 9.50 g/mol to about 28,000 g/mol.

Aspect 6. The support material of aspect 3, wherein the silicone oil has a molecular weight of from about 1250 g/mol to about 5,970 g/mol.

Aspect 7. The support material of aspect 3, wherein the silicone oil comprises poly(dimethylsiloxane).

Aspect 8. The support material of aspect 3, wherein the silicone oil comprises from about 0.1 to about 0.9 wt % poly(dimethylsiloxane) and from about 0.1 to about 0.9 wt % poly(methylphenylsiloxane).

Aspect 9. The support material of any of aspects 3-8, wherein the silicone oil comprises a viscosity of from about 5 cSt to about 1000 cSt.

Aspect 10. The support material of any of aspects 3-8, wherein the silicone oil comprises a viscosity of from about 10 to about 100 cSt.

Aspect 11. The support material of any of aspects 1-9, wherein the dispersed phase comprises water, glycerol, or a combination thereof.

Aspect 12. The support material of aspect 11, wherein the dispersed phase comprises a glycerol:water ratio of from about 100:0 to about 0:100.

Aspect 13. The support material of aspect 11, wherein the dispersed phase comprises a glycerol:water ratio of from about 50:50 to about 51:49.

Aspect 14. The support material of aspect 11, wherein the dispersed phase comprises 51% glycerol and 49% water.

Aspect 15. The support material of any one of aspects 1-14, wherein the dispersed phase and the continuous phase comprise matching refractive indices.

Aspect 16. The support material of aspect 15, wherein the support material is optically clear.

Aspect 17. The support material of any of aspects 1-16, wherein the inverse emulsion comprises a volume fraction of the dispersed phase of from about 0.64 to about 0.85.

Aspect 18. The support material of any of aspects 1-17, further comprising a surfactant.

Aspect 19. The support material of aspect 18, wherein the surfactant comprises cyclopentasiloxane and dimethicone copolyol, dimethicone and dimethicone copolyol, lauryl methicone copolyol, dimethicone copolylol, dimethicone copolyol and at least one C10-C16 isoparaffin, cyclopentasiloxane and dimethicone copolyol crosspolymer, alkyl dimethicone copolyol, a silicone glycerol emulsifier, or a combination thereof.

Aspect 20. The support material of aspect 19, wherein the dimethicone copolyol comprises PEG/PPG-18/18 dimethicone.

Aspect 21. The support material of any of aspects 1-20, wherein the inverse emulsion comprises a yield stress of from about 0.1 to about 100 Pa.

Aspect 22. The support material of any of aspects 1-20, wherein the inverse emulsion comprises a yield stress of from about 1 to about 20 Pa.

Aspect 23. The support material of any of aspects 1-20, wherein the inverse emulsion comprises a yield stress of 5 Pa.

Aspect 24. A method for 3D printing soft matter, the method comprising injecting an ink into the support material of any of aspects 1-23.

Aspect 25. The method of aspect 24, wherein the ink comprises poly(dimethylsiloxane) or poly(methylphenylsiloxane).

Aspect 26. The method of aspect 24 or 25, wherein the ink comprises a polymer having a molecular weight of from about 1250 g/mol to about 28,000 g/mol.

Aspect 27. The method of aspect 24 or 25, wherein the ink is UV-curable.

Aspect 28. The method of any of aspects 24-27, wherein the ink is injected into the support material with a deposition rate of from about 10 to about 10,000 µL/h.

Aspect 29. The method of any of aspects 24-27, wherein the ink is injected into the support material with a deposition rate of from about 100 to about 1000 µL/h.

Aspect 30. The method of any of aspects 24-29, wherein the ink is injected into the support material with a translational velocity of from about 0.01 to about 20 mm/s.

Aspect 31. The method of any of aspects 24-29, wherein the ink is injected into the support material with a translational velocity of from about 1 to about 10 mm/s.

Aspect 32. The method of any of aspects 24-31, wherein interfacial tension between the support material and the ink is from about 0.1 mN/m to about 10 mN/m.

Aspect 33. The method of any of aspects 24-31, wherein interfacial tension between the support material and the ink is about 3.4 mN/m.

Aspect 34. An article comprising soft matter produced by the method of any of aspects 23-32.

Aspect 35. The article of aspect 34, wherein the soft matter comprises a minimum stable feature size of from about 4 to about 80 µm.

Aspect 36. The article of aspect 34 or 35, wherein the article comprises a model organ or portion thereof.

Aspect 37. The article of aspect 36, wherein the article comprises a heart valve, an ear fitting for a hearing aid, a nasal fitting for a respiratory aid, a nasal fitting for a sleep apnea device, a custom vasculature implant, or a custom ostomy seal.

Examples

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Figure 8:
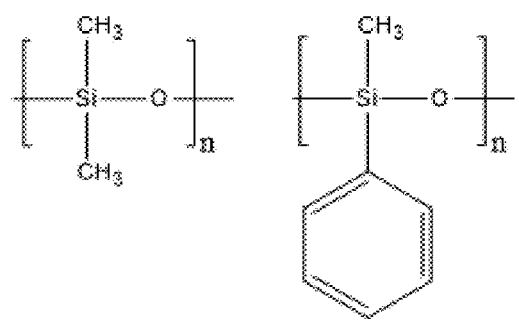
FIG. 8 shows (left) a structure of poly(dimethylsiloxane) (PDMS) and (right) a structure of poly(methylphenylsiloxane) (PMPS).

Example 1: Influence of Jammed Emulsion Droplets on Liquid-Liquid Phase Separation The phase behavior of the liquid-liquid multi-phase systems and the rheological behavior of jammed systems are well-studied topics, separately, but their interdependencies have not previously been studied. It is expected that the phase behavior of the jammed water-in-silicone oil inverse emulsion poly(methylphenylsiloxane) (PMPS) and poly(dimethyl) siloxane (PDMS) (see FIG. 8) two-phase system and the dimensions and curvature of the discontinuous phase will be controlled by the yield stress of the jammed emulsion without changing the phase boundary. Homogenous mixtures of the multi-phase system at different weight fractions of PDMS and PMPS as the continuous phase of the jammed inverse emulsion will be used to study phase separation using small angle light scattering and optical microscopy. It is expected that the signal from the small angle light scattering will give an insight onto the bulk of the sample and optical microscopy will enable visual conformation of the sizes and shapes of the discontinuous phase under the jammed system over time.

As a first step, samples of PMPS and PDMS will be obtained and a phase diagram of this system will be constructed, as the phase behavior is known to change with change in molecular weight and polydispersity of the components. Polymer blends of PDMS and PMPS with PDMS weight fractions of 0.1, 0.25, 0.5, 0.75, 0.9 will be prepared and vortexed at a temperature of 180° C. to create a single-phase system. The polymer blend will then be annealed to 4° C. and the cloud point will be identified using small angle light scattering and brightfield microscopy. With the cloud point being identified for different weight fractions of the polymer blend, the phase diagram of the polymer blend will be mapped. The kinetics at which the phase separation takes place for a given quench rate will also be better understood. This will serve as a valuable control for comparison with the behavior of the same system under jamming conditions.

Phase separation of PDMS and PMPS blends of known phase diagram but within a jammed inverse emulsion will be examined as follows. Inverse emulsions with the continuous phase consisting of a PDMS and PMPS blend at PDMS weight fractions of 0.1, 0.25, 0.5, 0.75, 0.9 will be prepared.

The aqueous phase of the inverse emulsion consists of water and glycerol mixed at a weight fraction so that its refractive index matches that of the continuous phase. Inverse emulsions with volume fractions of the aqueous phase ($\phi_{aq}$) at 0.70, 0.75, 0.80, 0.85 will be prepared to create jammed emulsions with different yield stresses (see FIGS. 5A-5D). The droplet size will be controlled and monodispersed by using a homogenizer to prepare the inverse emulsions. To characterize whether a given volume fraction of inverse emulsion behaves like a solid or a liquid, oscillatory frequency sweep at low strain amplitude (1%) will be conducted to measure the loss moduli (G") and the storage moduli (G') of the different compositions. To identify the yield stress ($\gamma_c$) of the jammed emulsion, a unidirectional shear rate ($\dot{\varepsilon}$) sweep will be applied to measure the corresponding shear stress ($\gamma$). The scaling relationship between the measured yield stress ($\gamma_c$), the emulsion droplet size ($D_{drop}$), and the storage modulus at 1 Hz ($G_{1Hz}'$) will be determined. It is expected that the phase separation under jamming results in the formation of irregular/skewed shapes of the discontinuous phase and that the attribute distribution of the discontinuous phase will be strongly controlled by the yield stress of the jammed emulsions.

The jamming transition of soft packed microgels has been used for 3D printing soft structures, living cells, and tissues. The rheological characterization of these jammed microgels reveals a critical shear stress above which the bulk phase yields and starts to flow and below which it stays as a solid. Jammed emulsions have been noted to exhibit similar behavior and in order to study and characterize this behavior, jammed inverse emulsions of water in silicone oil were made. This technique of 3D printing requires the support material to be clear, in order to image and analyze the structures fabricated within it during and after the print. In order to make the emulsions clear and transparent, the refractive index of the aqueous and oil phase was matched by adding 51 w % of glycerol to the aqueous phase. The continuous phase consisted of silicone oil (10 cSt) mixed with an emulsifying agent, DOWSIL 5225c formulation aid, at 10 w % of the total emulsion weight. The aqueous phase is then dripped into the continuous phase while homogenizing for 15 minutes. Inverse emulsions at volume fractions of the aqueous phase ($\phi aq$) at 0.65, 0.70, 0.75, 0.80 and 0.85 were prepared and characterized using unidirectional shear rate and oscillatory strain frequency sweep tests. The yield stress was found to be highly tunable by modifying the volume fraction of the inverse emulsion and also by changing the droplet size.

Figure 9:
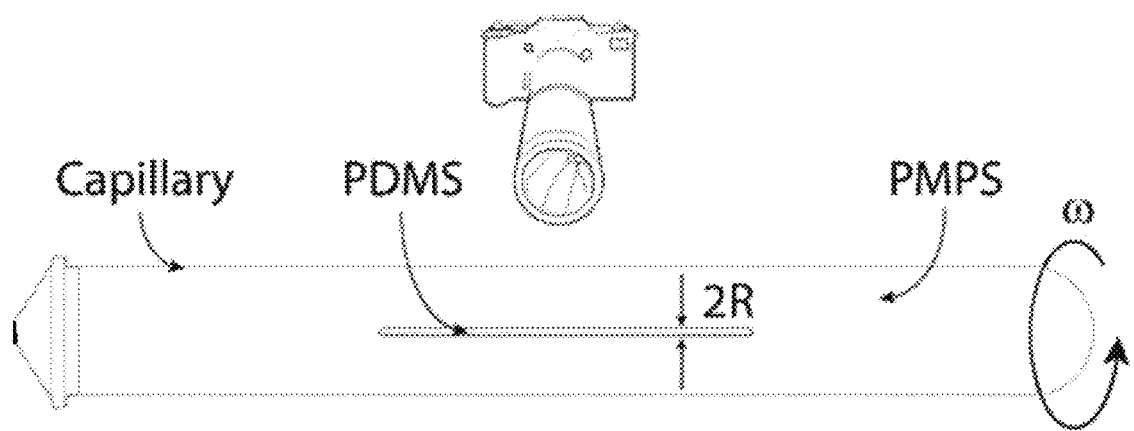
FIG. 9 shows a schematic of a spinning drop method, where a capillary tube filled with a bulk phase of a denser component and a drop of a lighter component is rotated at a constant angular velocity. The droplet radius correlates with the interfacial tension between the two liquids through Vonnegut's equation.

Example 2: The Role of Interfacial Tension in the Stability of Small Printed Features Interfacial tension between the printed ink and the jammed system is known to cause interfacial instability leading to the disintegration of printed structures, a phenomenon that is believed to be controlled by the yield stress of the jammed microgel, while disintegration time is believed to be controlled by ink viscosity. A need exists for the quantification of the minimum stable feature size from the interfacial tension and the yield stress of the jammed material. A further need exists to develop a scaling rule that relates the minimum feature size corresponding to the interfacial tension and the yield stress of the jammed emulsion. It is believed that interfacial instability related disintegration of silicone structures will be nullified by creating a jammed emulsion system with the continuous phase as a silicone oil having slightly different chemistry than the ink (PDMS or PMPS). Interfacial tension measurements will be carried out using the spinning drop method, which is versatile and well suited to characterize liquid-liquid systems with ultra-low interfacial tension (FIG. 9). The calculated interfacial tension, the yield stress of the jammed emulsion, and the viscosity of the ink will enable the development of a scaling rule that quantifies the lowest printable feature that is indefinitely stable.

PDMS and PMPS are similar organosilicon polymers having different side chains. Though the surface tension of PDMS and PMPS are known separately, there exists a need to determine the interfacial tension between the two in order to quantify the minimum feature size of any resulting printed structures. Interfacial tension between the PDMS and PMPS can be determined using the spinning drop method. This method is performed using a glass capillary tube aligned horizontally along its axis and filled with the heavier phase and a drop of the lighter phase. When the capillary tube is rotated along its axis at angular velocity $\omega$, the drop of lighter phase aligns and elongates along the axis of rotation because of the centrifugal force; the radius of the elongated droplet (R) correlates with the interfacial tension $\gamma$, as given by Vonnegut's equation:

$$\gamma = [(\Delta\rho \cdot \omega^2)/4] \cdot R^3$$

where $\Delta\rho$ is the density difference between the drop and the surrounding liquid. In the present case, since PMPS is the heavier component ($\Delta\rho = 0.1246$ g/cc), the bulk phase of the capillary will be filled with PMPS and the isolated drop will be made from PDMS. For a fixed angular velocity, the radius of the elongated PDMS droplet perpendicular to the axis of rotation will be determined using a long working distance microscope objective mounted on a high-resolution camera. From the difference between the surface tensions of each individual fluid, the interfacial tension between PDMS and PMPS is estimated to be around 3.4 mN/m. Thus, Vonnegut's equation predicts that rotating the sample at angular velocities between 25 and 100 rad/s should drive the PDMS droplet to axially elongate and radially narrow down to diameters between 500 µm and 1.25 mm. To minimize the error due to the curvature related force contributions from the ends of the elongated PDMS drop of the interface, the volume of the droplet should be fixed in such a way that the length of the elongated droplet is greater than four times the droplet diameter. The minimal droplet volumes corresponding to these diameters are between 2 and 7.5 µL, which fall within the typical range used in spinning droplet tensiometers. The ultra-low interfacial tension between PDMS and PMPS, as measured by the spinning drop method, is estimated to be around 3.4 mN/m, based on the difference in surface tension measurements of the individual components.

It is believed that the interfacial tension between the two components will be affected when one of the components is the continuous phase of a jammed system. To confirm this hypothesis, the spinning drop method will be repeated to determine the interfacial tension between PDMS and a jammed inverse emulsion with PMPS as the continuous phase. Vonnegut's equation will be modified in this case to relate the yield stress of the jammed emulsion ($\sigma$), through the interfacial tension:

$$\gamma = [(\Delta\rho \cdot \omega^2)/4] \cdot R^3 - \kappa \sigma R$$

where $\kappa$ is the geometric coefficient. Interfacial tension measurements will be made at angular velocities between 25 and 100 rad/s to reduce the error associated with the droplet size measurement. In these tests, the centripetal forces on the emulsions could cause them to yield and separate from the PMPS droplet trapped within them. Balancing these opposing forces, the minimum yield stress needed to prevent spontaneous emulsion flow is estimated to be approximately $10^{-4}$ Pa, which is many orders of magnitude lower than the yield stresses of samples proposed here. Thus, it is expected that the spinning drop tensiometer can be modified to make it compatible with using jammed emulsions as the continuous phase. At the completion of this study, a technique based on Vonnegut's equation to measure the interfacial tension of a species within a jammed emulsion will have been developed.

It is believed that the balance between the interfacial tension and yield stress will determine the smallest feature that can be 3D printed with the emulsion-supported technique disclosed herein. To identify the limiting conditions of stability and explore their fundamental origins, PDMS will be printed into jammed inverse emulsions with PMPS as the continuous phase and vice versa. Jammed inverse emulsions having different yield stresses using PMPS as the continuous phase will be produced and linear features of PDMS oil will be 3D printed directly into these packed emulsions. Features having different cross-sectional areas will be produced by varying the nozzle translation speed and the PDMS flow rate. The stability of the features will be analyzed over time thorough time-lapse measurements and the minimum stable feature size will be determined for jammed inverse emulsions having different yield stresses. The same experiment will be repeated for measuring the minimum stable size of PMPS features in jammed inverse emulsion with PDMS as the continuous phase. Further, a scaling relationship that quantifies the minimum stable feature diameter for given yield stress of the jammed system and the interfacial tension will be established.

It is expected that ultra-low interfacial tension between PDMS and PMPS oils will be observed, as they are chemically similar, and it is estimated to be close to the difference of their individual surface tensions which is 3.4 mN/m. The modified Vonnegut's equation is predicted to determine the interfacial tension between one component inside a jammed system and the other free component. It is further expected that the minimum features size will be proportional to $\gamma/\sigma$. These results will enable predictive control over the quality and the overall performance of this new 3D printing technique for new material pairs to be used in future applications.

Samples having different yield stresses are prepared at different emulsion packing fractions, which may result in different surfactant concentrations in their continuous phases. To account for excess surfactants in the continuous phase and their potential adsorption to the PDMS-PMPS interfaces, surfactant concentration will be measured using UV-vis spectroscopy. With this procedure, new scaling relationships that predict minimum printed feature size can be determined. In some experiments, phase separation studies can be carried out within jammed silicone microgels instead of jammed inverse emulsion, since no surfactants are typically present in microgel systems.

Figure 6:
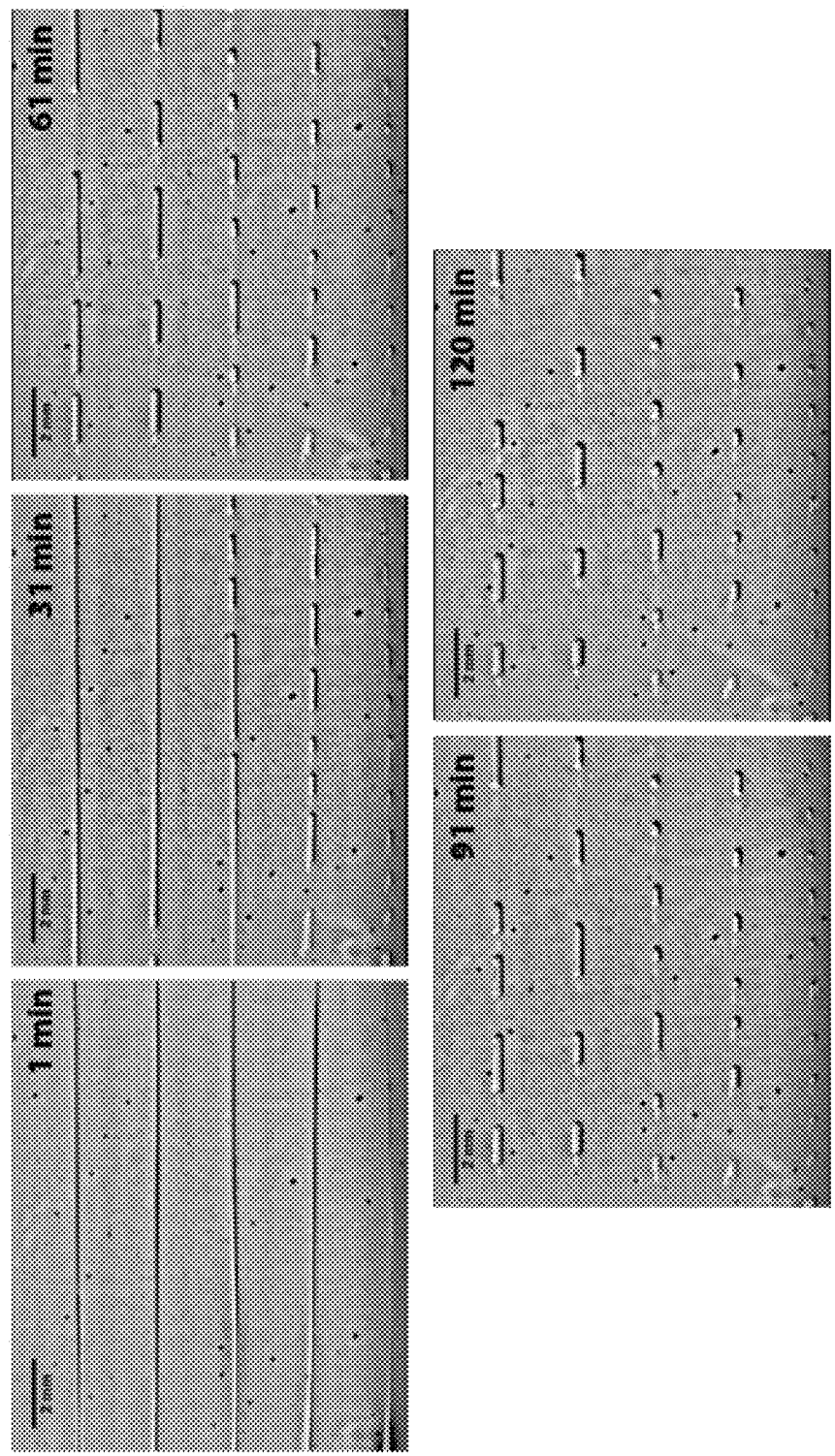
FIG. 6 shows time-lapse measurements of neat silicone oil printed into jammed micro-organogel. The interfacial tension between the micro-organogel and the silicone oil results in instability-related breakups. The breakup time of the features depends on the feature size and the viscosity of the printed silicone oil. The features after breakup reduce total interfacial energy by reforming closer to a spherical shape. In one aspect, the jammed inverse emulsion supports disclosed herein allow for longer stability of microscopic features when compared to micro-organogel supports.

The role of interfacial tension on the break-up of the printed structures has been briefly studied previously. Neat silicone oil was printed into jammed micro-organogel made up of self-assembled block copolymers. The feature size of the printed ink was controlled by controlling the flow rate of the ink (Q) and the translational speed (v) of the printing needle. Upon analyzing the printed features over time, the interfacial tension between the silicone oil and the jammed micro-organogel resulted in the instability-related disintegration of the features (see FIG. 6). The stability of the printed features was found to increase with increasing diameters for printed features, the viscosity of the printed features, and the yield stress of the jammed system containing them. It is expected that the minimum stable feature size can be measured using similar methods for quantification from the interfacial tension measurements and yield stress of the jammed emulsion (see FIGS. 7A-7B).

Example 3: Quantification of Accuracy and Variability of 3D Printed Silicone Structures Made with Fine Features Printing into a jammed system has proven to be an effective technique for the fabrication of a variety of soft matter and finds application in silicone fabrication and also in tissue engineering. However, jammed systems previously used for 3D printing have been packed microgel systems and thus the effectiveness of using a jammed emulsion system should be explored. Emulsions are a very attractive alternative to microgels, as the development of a jammed emulsion system is very simple and highly versatile with respect to the material being printed, and further possesses tunable rheological properties. The effectiveness of using jammed emulsion as a support medium with PMPS or PDMS as the continuous phase to fabricate silicone structures will thus be investigated. By leveraging phase separation and employing jammed emulsions having very low interfacial tension with the ink, stable features of very high resolution and surface finish can be printed. Spherical segments having different curvatures with will be printed with fluorescently labeled ink and surface curvatures measured using confocal microscopy, while surface roughness will be explored using scanning white light interferometry (SWLI) and scanning electron microscopy (SEM). Deviation of the measured curvature from the coded curvature will quantify the accuracy of the printed structure and the measure of the surface roughness will be quantified as the variability of the printed structure.

The cross-sectional area (A) of the printed silicone structures is quantified by the translational speed (v) of the printer and the flow rate (Q) of the ink using the continuum equation, Q/v=A. A need exists to validate this equation in terms of estimating the feature size for this technique of printing silicone structures within the jammed emulsion. In this study, a UV-curable liquid silicone rubber (Momentive UV Electro 225) diluted with rhodamine-tagged silicone oil will be printed into jammed inverse emulsions at different printing speeds for the printer and different flow rates for the ink. The cross-sectional area of the printed features will be measured using confocal microscopy by collecting the z-stacks and sampling the diameters along the vertical and lateral directions of printing. The linear scaling of the cross-sectional area with the ratio of the ink flow rate and the translational speed will be analyzed. Similarly, the maximum print velocity for jammed emulsions of different yield stress will be identified by measuring the deviation between the diameters along the vertical and lateral directions of printing at a given print speed. Linear scaling between the cross-sectional area of the printed features and the ratio of flow rate to print velocity will then be established. Maximum possible print velocity for given yield stress of the jammed emulsion will also be determined.

Quantification of the quality and the mechanical strength of the printed structures will serve as benchmarking data with respect to the effectiveness of using the disclosed techniques. Spherical segments having different radii of curvature and constant depth will be printed. Momentive UV Electro 225 diluted fluorescently tagged silicone oil will be used as the ink. The printed structures will be analyzed using confocal microscopy. The curvature of the printed spherical segments will be measured by collecting z-stacks of the printed feature. The intensity projections onto the x and y axes will be fitted to a circle sector and the sector's radius will be compared against the coded curvature to measure the accuracy of the printed structures. To measure the variability, the surface roughness of the spherical segments will be measured using scanning white light interferometry and scanning electron microscopy. To test the mechanical strength of the printed structures, "dog-bone" structures will be printed in both horizontal and vertical direction and the cured structures will be subjected to extensional stress-strain tests to measure mechanical integrity. At the completion of this study, it is expected that highly uniform features with excellent mechanical integrity owing to superior layer-to-layer and lateral layer adhesion will be observed.

It is further expected that a linear relationship between the cross-sectional area of the printed feature and the ratio of the flow rate to the translational velocity of the printing needle will be observed. The measurement of the printed feature sizes is expected to show the ability to fabricate uniform feature sizes as small as 3 μm in diameter which are indefinitely stable over time. For inverse emulsions with a yield stress of 4-5 Pa, stable and uniform features even at translational velocities of 20 mm/s should be observed.

In some experiments, the lower surface tension between the ink and the jammed emulsion may result in a rough surface on the printed objects. In the event of such an outcome, the combination of Q and v that reduces the roughness along the printed surface will be identified. Modifying the layer height of the print with respect to the printed feature size should eliminate this problem. Preliminary results suggest that the diffusion of fluorescently tagged silicone oil of 100 cSt takes up to 2 hours to diffuse 500 μm from the ink boundary into the jammed system. The diffusion of the fluorescent species from the ink can be reduced considerably by increasing the molecular weight of the silicone oil to which it is tagged. Since the time to print the spherical segments will be between 5 to 15 minutes based on the print speed, feature surface and roughness can still be analyzed without difficulties.

In order to see if the jammed emulsion behaves as the same way as the jammed microgels, structures of Momentive UV Electro 225 are printed within a jammed emulsion with a yield stress of 5 Pa. Intricate features and complex geometries that were extremely robust upon curing were printed. In order to see if the printed feature size scales with the translational speed and the flow rate of the printing needle, the Part A of the PlastSil formulation diluted with low viscosity silicone oil (10 cSt) was printed within the jammed emulsion with a yield stress of 5 Pa. The features were printed at translational velocities between 0.1 and 20 mm/s and flow rates between 10 to 5000 μL/hr. The printed feature diameters are measured using brightfield microscopy and it scales linearly with the ratio of the flow rate to translational speed of the printing needle. The printed features can be predicted from the continuum equation:

$$(\pi D^2)/4 = (Q/v)$$

where D is the diameter of the feature to be printed, Q is the flow rate of the ink, and the v is the translational speed of the print. In this case, the PlastSil formulation is miscible in the jammed emulsion with PDMS as a continuous phase and even smaller and uniform features should be observed when printed within a jammed emulsion with PMPS as the continuous phase.

Example 4: Materials and Methods

Jammed Emulsion Support Material Formulation

Inverse emulsions of aqueous droplets in silicone oil were prepared using DI water, glycerol (Fisher Scientific), silicone oil (Gelest DMS-T11, 1250 g/mol molecular weight; 10 cSt viscosity) and diglycerol emulsifier (DOWSIL 5600, cetyl diglyceryl tris(trimethylsiloxy)silylethyl dimethicone). The aqueous droplet phase consists of DI water and glycerol mixed at a 48:52 weight ratio to get a refractive index of 1.399, which is that of the continuous phase. The continuous phase consists of silicone oil mixed with the emulsifier; the concentration of the emulsifier was fixed at 1% (w/w) relative to the total emulsion weight. Emulsions were formulated by dripping the aqueous phase into the continuous oil phase while homogenizing using an IKA Ultra-Turrax homogenizer; formulations with different volume fractions and homogenization rates were prepared using this protocol. For all the printing described herein, an emulsion formulation with an aqueous phase volume fraction of 0.75 homogenized at 8000 rpm was employed.

Fluorescent PDMS Ink Synthesis

Reagents and solvents were purchased from commercial sources and used without further purification unless noted otherwise. To formulate a fluorescently labeled PDMS ink for printing, fluorescein (2.00 g, 6.02 mmol), cystamine dihydrochloride (4.07 g, 18.1 mmol), 4-dimethylaminopyridine (DMAP; 0.222 g, 1.81 mmol), and ethylcarbodiimide hydrochloride (EDC·HCl, 3.46 g, 18.1 mmol) were combined in a flame dried round bottom flask under Argon (Ar). At 0° C., dry DMF (30 mL) was added followed by triethylamine (TEA; 5.0 mL, 36 mmol). The reaction was stirred overnight (16 h) and warmed up to room temperature. The reaction mixture was diluted with methanol (MeOH; 15 mL) and DI water (15 mL) and the pH was adjusted to 7 with aqueous HCl (1 M). Dithiothreitol (5.0 g, 32 mmol) was added under Ar and the reaction was stirred overnight (12 h). Upon acidification with aqueous HCl (1 M) to a pH of 3, the product precipitated from the reaction mixture. After centrifugation and drying in vacuo, Fluo-SH was obtained as a red solid (0.82 g; 2.0 mmol; 33% yield) and used without further purification.

Vinyl-terminated PDMS (MW=28,000 g/mol, Gelest Inc., 2.5 g, 0.089 mmol), and 2,2-dimethoxy-2-phenylacetophenone (DMPA, 0.002 mg, 0.009 mmol) were dissolved in THF (15 mL) in a round bottom flask. Fluo-SH (0.28 g, 0.71 mmol) was added in DMF (0.5 mL), and the solution was sparged with Ar for 15 min. Subsequently, the thiol-ene reaction was initiated with UV light. After 4 h stirring in the UV light the reaction was exposed to oxygen and the solution was diluted with methanol, causing a phase separation with PDMS in the bottom layer. The PDMS layer was collected and residual solvent was removed on a rotary evaporator. The crude product was re-dissolved in hexanes (5 mL) and the solution was filtered through a syringe filter (0.45]mum) to remove any precipitates. This cycle of methanol-induced phase separation followed by filtration in hexanes was repeated three times until the methanol supernatant remained clear. The final product Fluo-PDMS was obtained after drying in vacuo overnight.

Silicone Elastomer Inks Preparation

Brain aneurysm models were printed using a room temperature vulcanizing (RTV) silicone formulation, Gelest ExSil-100, homogenously mixed at a 100:1 base-to-crosslinker ratio at 3500 rpm for 30 s in a FlackTek DAC 150 SpeedMixer. Barium sulfate powder was added to the silicone ink at 1% (w/w) relative to the total formulation weight to facilitate CT imaging. The formulation was then degassed in vacuum for 5 minutes and then loaded into a BD plastic syringe. Heart valve model structures were printed using a UV-curable silicone formulation, Momentive UV Electro-225, mixed at 50:1 base-to-crosslinker ratio at 3500 rpm for 30 s; low viscosity silicone oil (Gelest DMS-T07; viscosity, 5 cSt) was added at 10% (w/w) relative to the total formulation weight to lower the viscosity of the silicone ink. Degassed ink was then loaded into a Hamilton Gastight syringe and used for printing. Post-printing, the structures were cured under a 320-390 nm UV flood lamp (Sunray) at full power (400 W). Dogbone samples for tensile testing were fabricated using the PlastSil-71 silicone formulation prepared at the manufacturer's recommended mixing ratio. A custom-made Peltier-based syringe cooler was used to increase the pot life of the mixed formulation long enough to accommodate the total print time. Linear structures for measuring the feature size and stability were printed using Smooth-On Mold Max 10 RTV silicone formulation; 5 cSt silicone oil was mixed at 10% (w/w) relative to the total formulation weight to lower the viscosity and degassed before printing.

Brain Aneurysm and Heart Valve Model Design

To create a realistic model of patient neurovasculature, high resolution cerebral angiography fluoroscopic data collected at the time of cerebral angiography is employed, where the neuro-interventionalist selectively injects non-ionic contrast medium into the internal carotid artery. With complete opacification of the ipsilateral anterior cerebral circulation, the Allura Xper FD20 Xray system (Philips Healthcare, Best, Netherlands) takes 122 images over 4.1 seconds during a 3D rotational prop scan over an arc of 240 degrees. The software reconstructs these images into a 3D model that is sent to a separate workstation for review. The 3D scan is segmented and processed to create a vascular wall by pixel dilation of the segmented image. The resulting image is then converted into a 3D aneurysm model and transformed into a series of 3D printing trajectories.

The 3D aneurysm model was printed in a series of trajectories in such a way that each path can be traced in a seamless spiral path. Each individual trajectory was obtained from PrusaSlicer, an open-source software, as a GCode file; the slicer settings were fixed to spiral trajectory with no top and bottom layer, with 0% infill, and with variable layer height between 300 and 400 microns. The obtained GCode files are parsed using a custom-written MATLAB script and are converted into trajectory file formats readable by a custom-built 3D printer. The neurovascular structures are printed, cured, then imaged using a TOSHIBA Acquilion ONE CT scanner, set to have a tube voltage of 120 kVp, an exposure time product of 262.5 mAs, a pitch factor of 0.625, and a volume CT dose index (CTDIvol) of 64.6 mGy.

Figure 16:
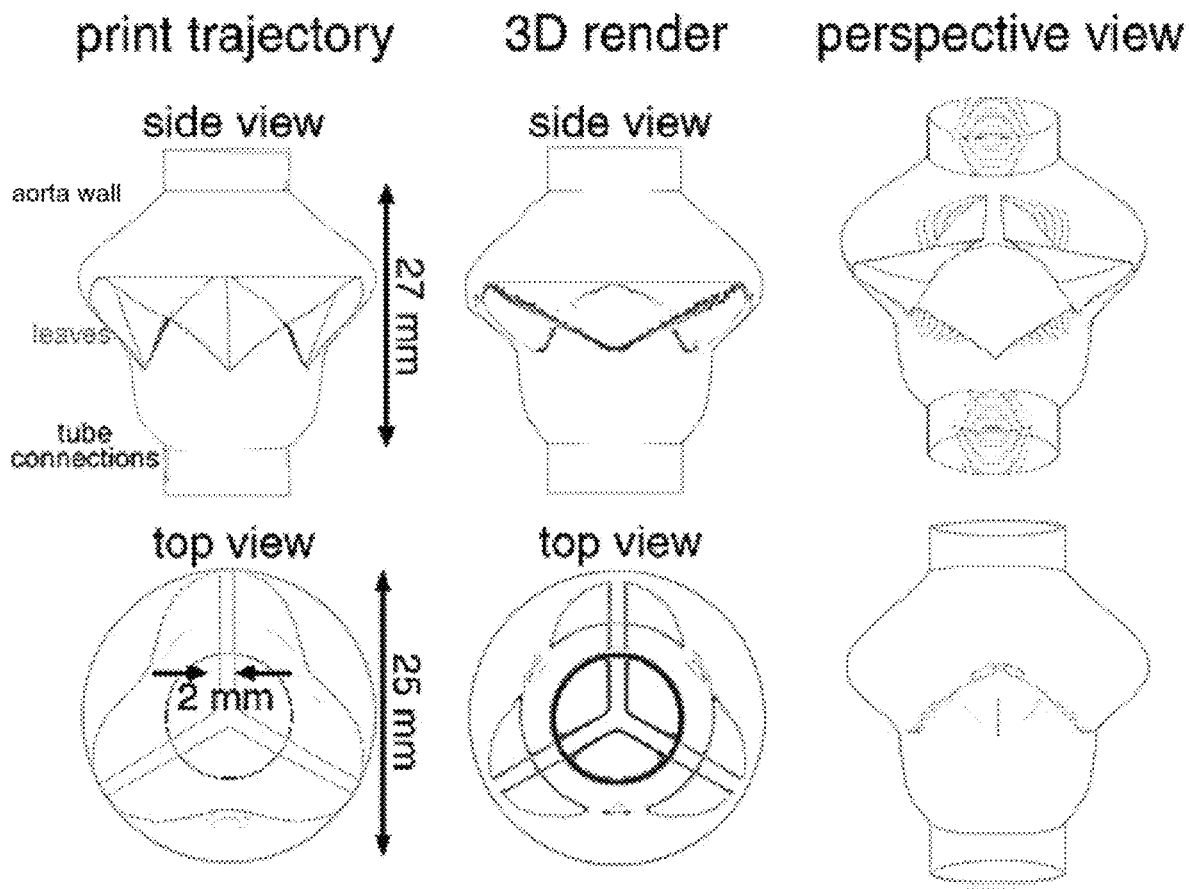
FIG. 16 shows modeling the aortic heart valve. Print trajectory of the model heart valve was designed by using typical geometric dimensions of the human aortic heart valve available in the literature. The print trajectory is a single-trace spline path which enables a seamless and efficient printing of the sinus wall and valve leaflets with uniform wall thickness. Cylindrical extensions are modeled at the top and bottom of the heart valve to enable connections to tubes for structure-performance testing of the cured structure. 3D render of the print trajectory as a solid mesh compares well with the native aortic heart valve.

The heart valve model was designed by using a custom MATLAB script using the dimensions of the human aortic heart valve to design different heart valve features in a continuous spiral path (FIG. 16). The diameter of sinus wall was chosen to be 25 mm, the leaf height was chosen to be 17 mm and the total valve height was chosen to be 27 mm. Cylindrical extensions with a diameter of 10 mm and a height of 5 mm were added to the top and bottom of the model to allow the cured structure to be clamped to fluid tubing during performance testing. The curved root and sinus walls of the valve were programmed as a segment of a sine function, seamlessly joined to the helical cylindrical paths of the tubing attachments. The valve leaflets were designed using helical paths that lay on the intersection of triangular shapes with the valve wall. Following the leaflet trajectory from bottom to top, the apex of each triangular layer lays on a segment of a sine function that begins at the wall and approaches the center of the valve. These path trajectories were generated in the format readable by a custom-built printer.

Embedded 3D Printing Procedure

All the disclosed printing technique was performed with a custom-made 3D printer made by using a linear stage as a syringe pump (Physik Instrumente) mounted to three linear translations stages (Newport). Printing needles were fabricated by pulling glass microcapillaries (1 mm outer diameter) using a pipette puller (David Kopf Instruments). The pulled capillaries were secured to Luer-lock hubs. Additionally, metal needles between 23 G and 34 G were used. These needles were Luer-locked to the printing syringes, loaded with the silicone ink, and mounted to the syringe pump. Custom-written MATLAB scripts and functions were used to produce precise trajectory paths for the syringe pump and the translation stages, which traces the needle tip along the designed 3D structure within containers containing the disclosed support material.

Rheological Protocols

All rheology characterization of the emulsions were performed using an Anton Paar MCR 702 rheometer, employing a roughened 25 mm parallel plate measurement geometry. Complex moduli were measured in the linear viscoelastic range by performing oscillatory frequency sweeps from 10 Hz to $10^{-3}$ Hz at a strain amplitude of 1%. The yield stresses of the packed emulsions were determined by measuring the shear stress during unidirectional shear rate sweeps, spanning shear rates from $10^{-2}$ to 100 $s^{-1}$. All samples were pre-sheared at 50 $s^{-1}$ for 60 seconds and then allowed to relax for 120 seconds before the rheology measurements.

Imaging Methods

Timelapse photographs of the printing process and the photographs of the silicone structures were taken using a Nikon D3100 camera under white LED light illumination with a multi-colored LED light foreground illumination. Micrographs and Z-stack images of the printed features were taken using a Nikon Eclipse Ti-E microscope with a C2 confocal scanning system. Brightfield images of single features were collected using an inverted Nikon Eclipse Ti-E microscope.

Feature Radius Measurements

Figure 7A:
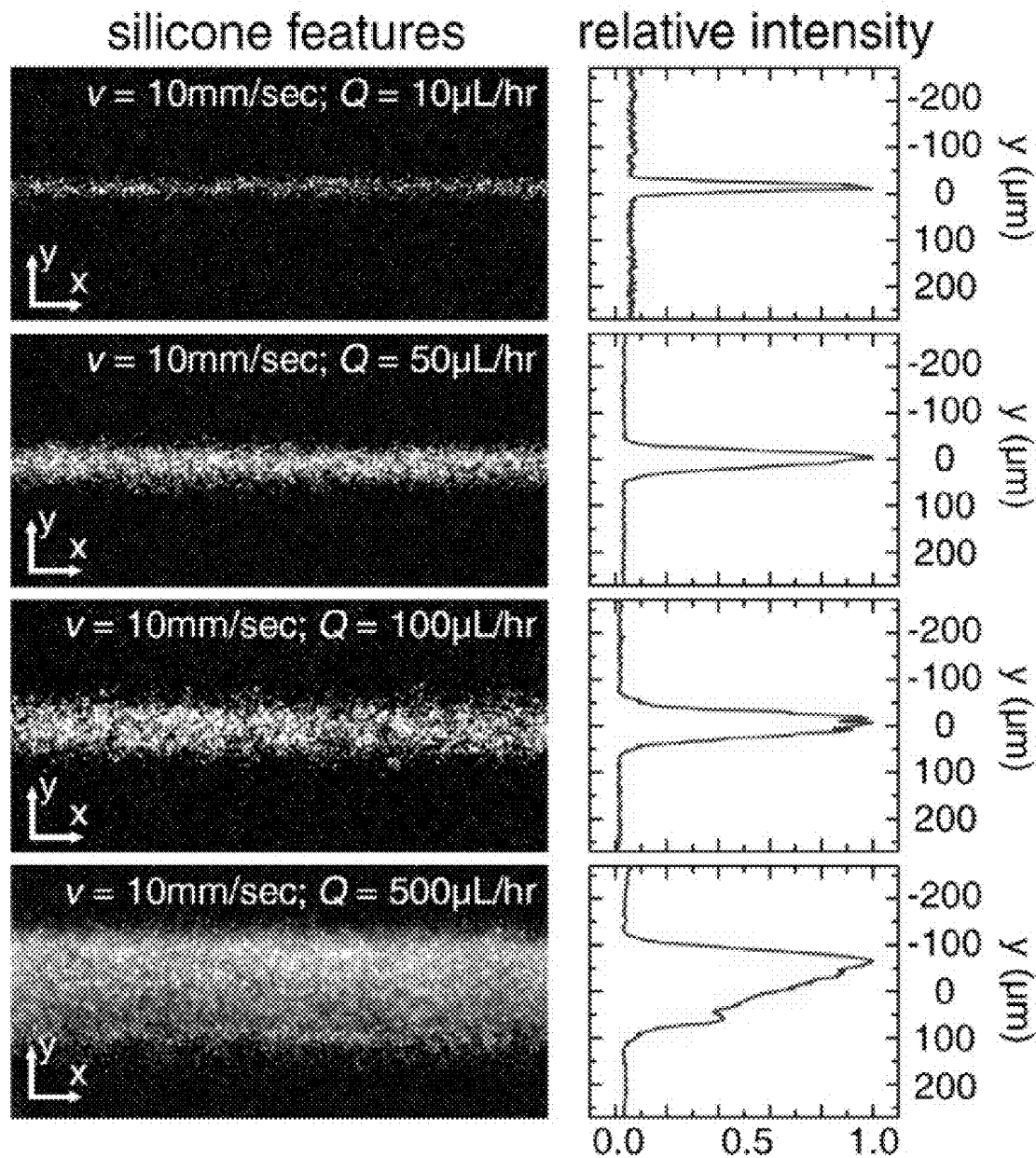
FIGS. 7A-7B show control of printed feature size.

The printed lines are imaged using brightfield microscopy, focusing on the mid-plane of printed features. The images are processed in MATLAB to remove background noise and to invert the intensity distributions. The processed intensity maps are then averaged along the long axis of printed features to create single intensity profiles, as shown in FIG. 7A. Each intensity profile is fit with a Gaussian function, given by $I(R)=Ie^{-(R-\mu)^2/(2\sigma^2)}$, where $\mu$ is the peak location and $\sigma$ controls the width of the function (FIG. 7A). The feature radius was estimated from the best fit value of $\sigma$, given by $r=2\sigma$.

Tensile Test Method

Dogbone shaped specimens are printed using a print-nozzle translation speed of v=2 mm/sec and a material deposition rate of Q=700 uL/hr, corresponding to a feature radius of r=175 μm. All tensile tests were performed using the Instron 5943. The test samples were designed and tested in accordance with the ASTM D412-C specifications and the extension rate for all samples was fixed to 500 mm/min. The stress and strain for the tested samples were calculated from the force and displacement values recorded by the instrument, using the cross-sectional area and the length of the sample in the central region of the dogbone. Plots of stress versus strain on a log-log scale revealed that the linear regime extended up to 20% strain. A line with no offsets was fitted to this region of the stress-strain curve to determine the tensile elastic modulus.

Surface Roughness Analysis

Figure 13A:
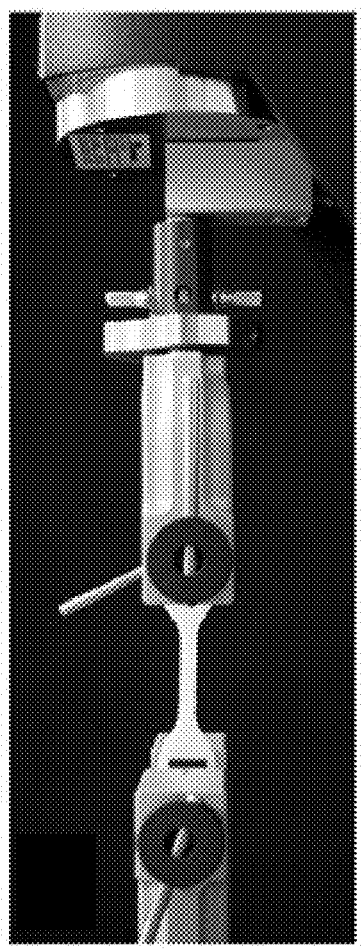
FIGS. 13A-13E show material and surface properties of the disclosed printed silicone structures.
Figure 13B:
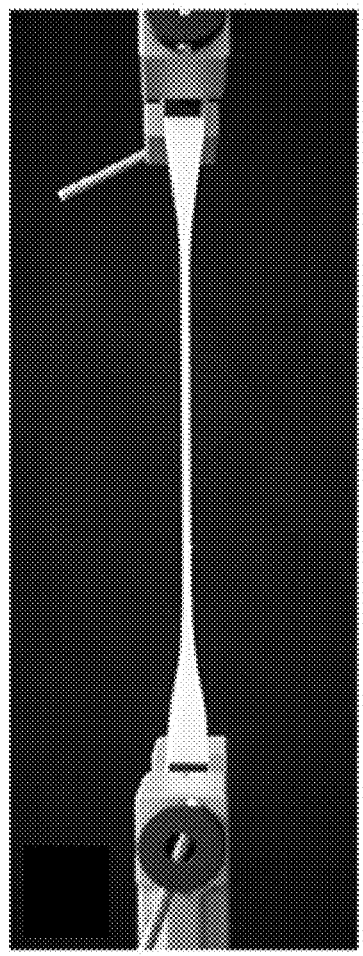
Figure 13C:
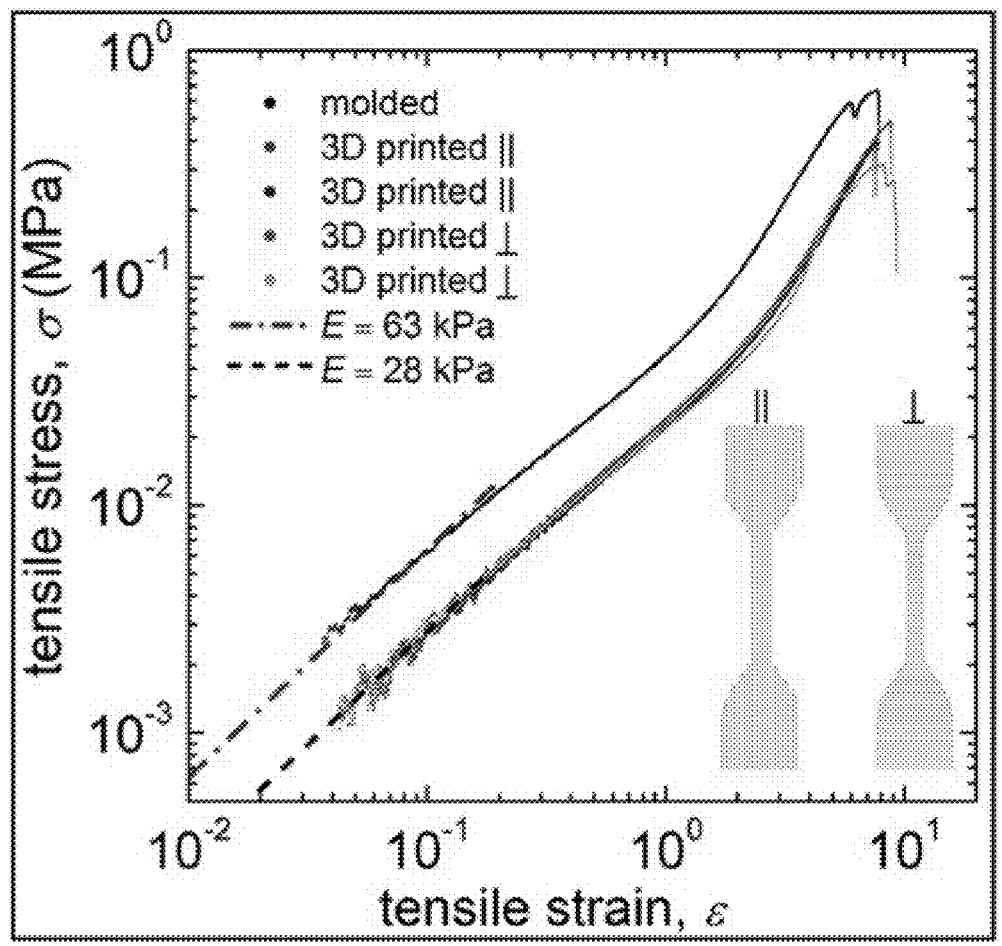
Figure 13D:
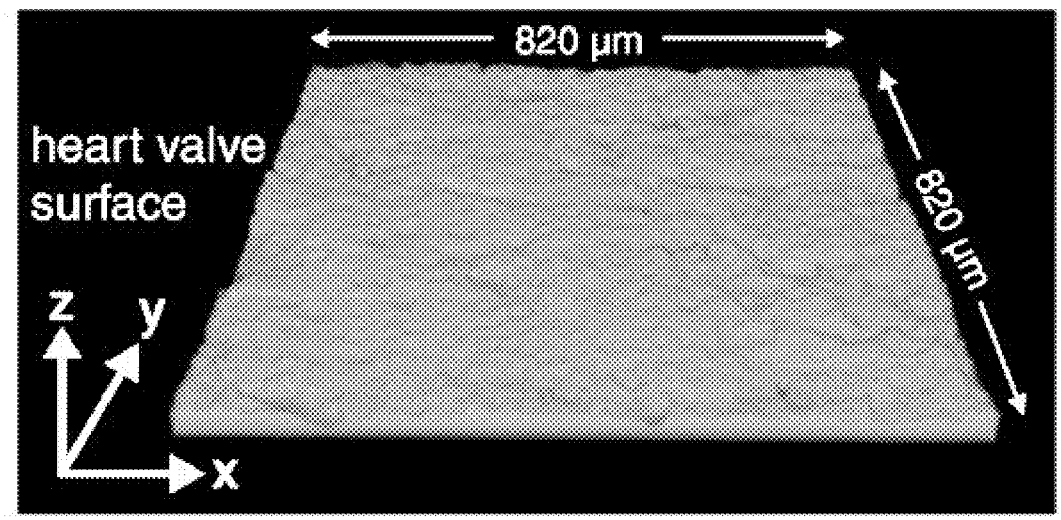
Figure 13E:
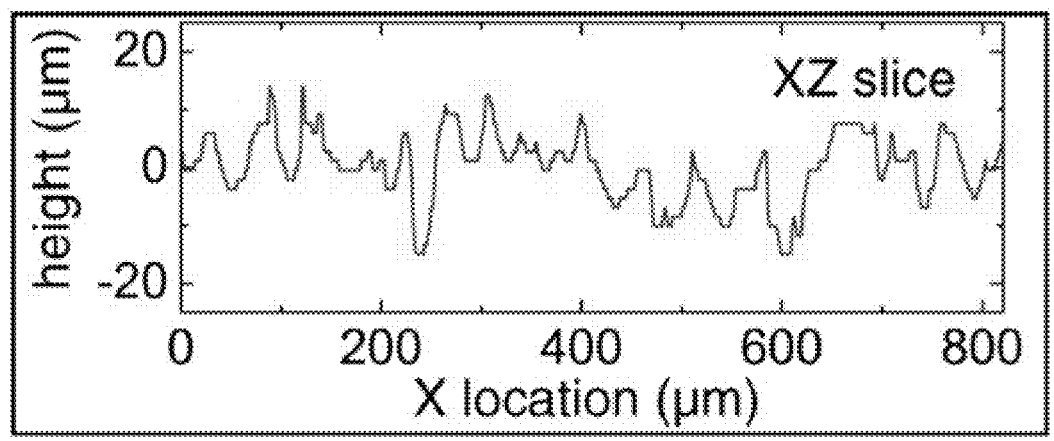

Sections of the heart valve model were cut from the fully 3D printed models and suspended approximately 170 μm above the microscope cover slip. Rhodamine solutions was wicked between the heart valve section and the cover slip. This procedure oriented the heart valve sections perpendicular to the optical axis of the confocal microscope. Intensity profile along the optical axis is analyzed at each X-Y location in the 3D Z-stack to determine a 2D map of surface locations. Each 2D map spans regions approximately 1 mm across (FIGS. 13D-13E). Surface roughness was quantified by computing the root-mean-square (RMS) distance between each measured surface location and the mean surface location. This quantity is determined from three different regions across the heart valve surface and averaged.

Control and Characterization of Emulsion Droplet Size

Figure 14A:
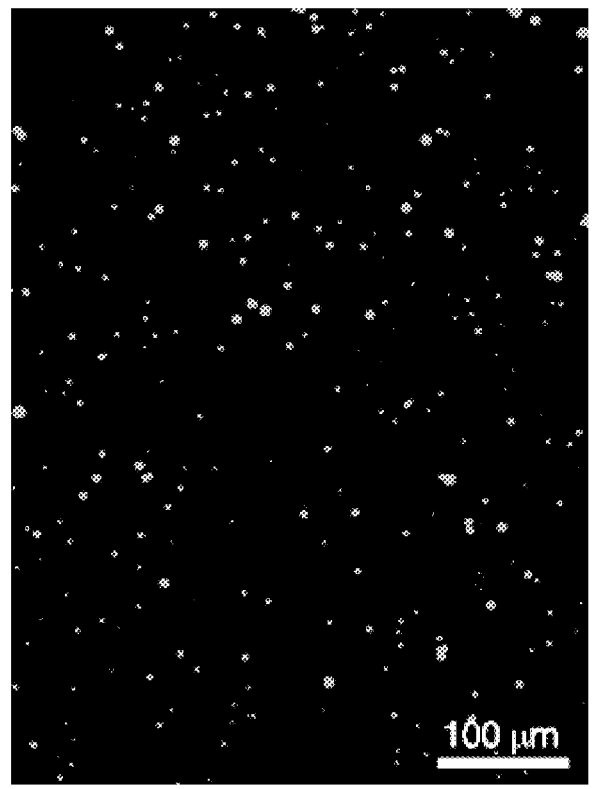
FIGS. 14A-14C show measurement of emulsion droplet sizes.

At a single volume fraction, $\phi$, the droplet radius, a, is expected to influence jammed emulsion rheology. Thus, to understand the rheological properties and related printing performance of the disclosed support materials, it is critical to measure the statistics of emulsion droplet radius. To measure the sizes of emulsion droplets, the aqueous phase was mixed with rhodamine 6 G at 10 μM concentration to make emulsions with a fluorescent droplet phase under conditions that will produce candidate suitable support materials. These materials are then dispersed and diluted for single-droplet size measurements. Stable emulsions made at different volume fractions, homogenization rates, and continuous phase viscosities are diluted in 1:10 silicone oil containing 1% (w/w) surfactant and imaged with fluorescence microscopy (FIG. 14A). The images are processed using custom written programs in MATLAB. To remove random background noise, a Gaussian filter with a width of 1 pixel size was first applied to the images. The droplets are then identified by segmenting the smoothed images using Otsu's method. The binary image is then further processed to remove the partial droplet images from the image boundaries, and then eroded and dilated to remove artifacts from remaining noise. The individual non-clustered droplets were labeled in the image by only measuring the cross-sectional areas of identified regions having an eccentricity less than 0.6. Effective droplet radius was computed from droplet cross-sectional area, assuming circular droplet geometry. Droplet radii are logarithmically binned and a normalized probability distribution (PDF) of droplet radius was constructed (FIG. 14B).

Figure 14B:
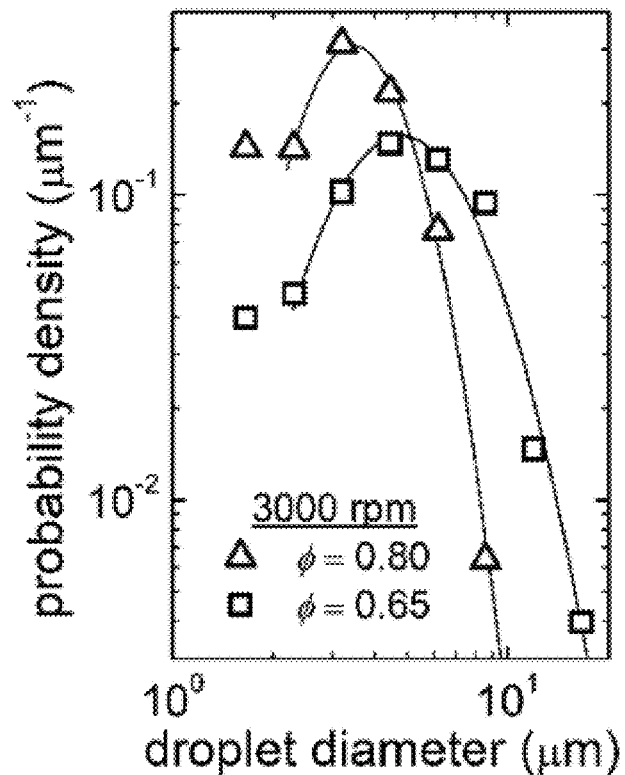
Figure 14C:
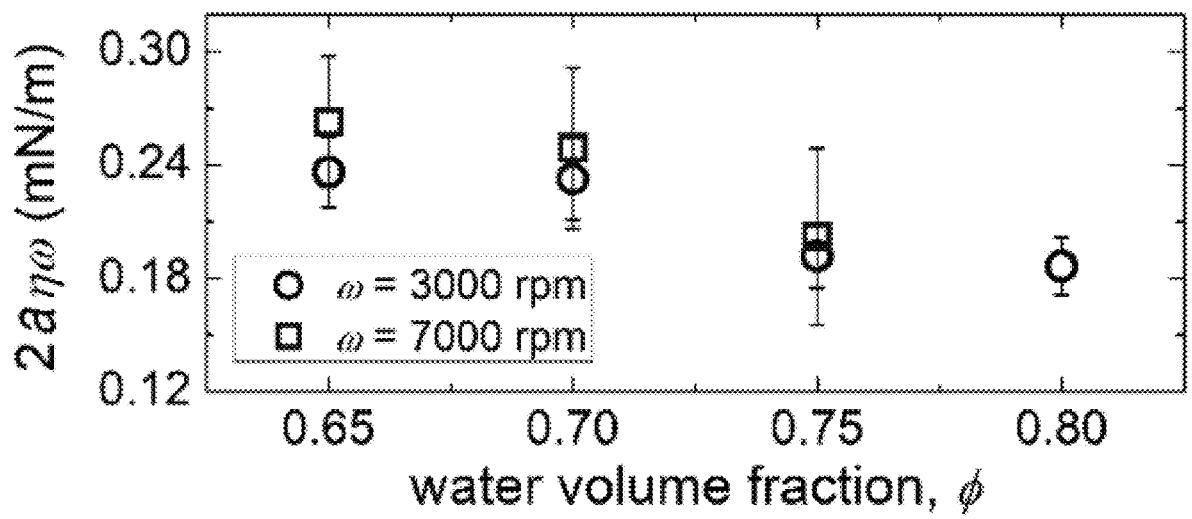

It was found that the droplet size distribution is dependent on the homogenization rate, $\omega$, emulsion volume fraction, $\phi$, and continuous phase viscosity, $\eta$; a higher value of $\omega$, $\phi$, or $\eta$ shifts the distribution toward lower droplet sizes (FIG. 14B). Plots of droplet size distribution resemble the log-normal lineshape. Thus, log-normal functions were fitted to the droplet size distributions to determine the median droplet size at each combination of $\omega$, $\phi$, and $\eta$. For example, in the case of an emulsion formulated at $\phi$=0.75, $\omega$=3000 rpm, and $\eta$=5 cSt, the median droplet diameter was found to be 5.38 μm. In the case of an emulsion formulated at $\phi$=0.75, $\omega$=7000 rpm, and $\eta$=5 cSt, the median droplet diameter was found to be 2.75 μm. The measured droplet diameters, 2a, for emulsions prepared at different $\omega$ collapse to a single curve that weakly decreases with increasing $\phi$ when the viscous shear stress during homogenization is accounted for (FIG. 14C).

Rheology of Jammed Inverse Emulsions

To formulate a variety of inverse emulsions suitable for the disclosed printing processes and to identify the best performing support material, emulsions were prepared at different homogenization rates, $\omega$, viscosities, $\eta$, and volume fractions, $\phi$. The rheological properties can be tuned by controlling droplet size, a, which is controlled by all these variables during the homogenization process. Likewise, $\phi$ controls the rheological properties independently. To determine the linear shear moduli, G' and G", of each emulsion formulation, oscillatory frequency sweeps spanning frequencies of 0.001 Hz to 10 Hz were performed, at low strain amplitudes of 1%. To determine the yield stress of each emulsion formulation, the shear stress was measured while performing unidirectional shear rate sweeps, covering shear rates between 100 s$^{-1}$ and 0.001 s$^{-1}$. The value of the yield stress was computed by fitting the data with the Herschel-Bulkley model, $\sigma\sigma=\sigma\sigma_{yy}(1+(\varepsilon\varepsilon/\varepsilon\dot{\varepsilon}_{cc})^{pp})$, where $\sigma$ is the measured shear stress, $\dot{\varepsilon}$ is the shear rate, $\sigma_y$ is the yield stress, $\varepsilon\varepsilon\dot{c}$ is the shear rate at which the viscous stress equals the yield stress, and p is a dimensionless number.

Figures 5A, 5B, 5C, 5D, 5E, 5F:
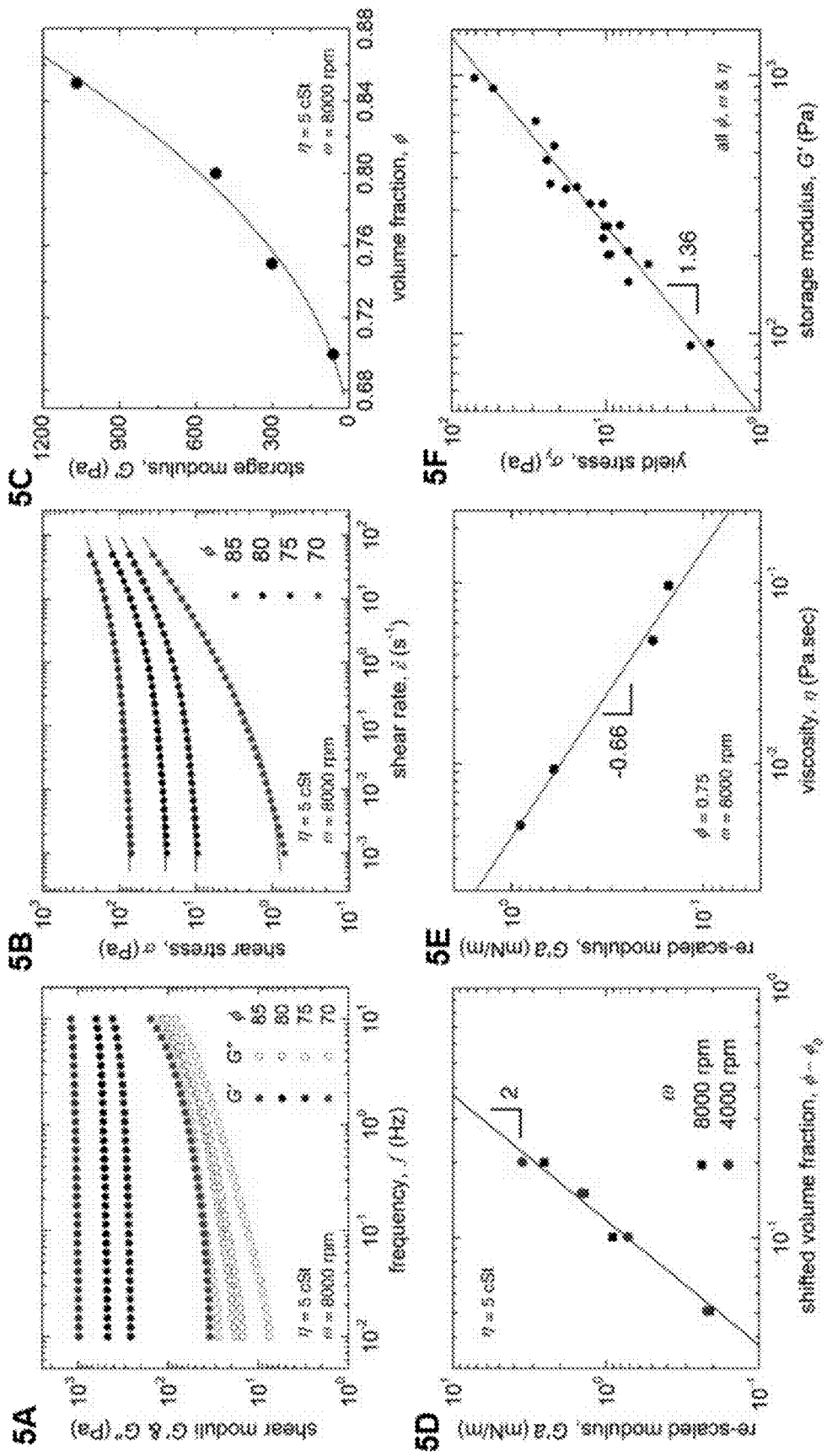
FIGS. 5A-5F show rheological characterization of jammed emulsions.

For samples prepared at a single homogenization rate, $\omega$=8000 rpm, in a continuous phase of silicone oil having a viscosity, $\eta$=5 cSt, it was found that the yield stress and the elastic modulus of the emulsion can be tuned by controlling the volume fraction, $\phi$ (FIGS. 5A-5B). To investigate the dependence of elastic modulus on emulsion volume fraction, $\phi$, above a minimal packing fraction, $\phi_0$, the value of G' was determined at f=0.1 Hz for emulsions made at a $\omega$=8000 rpm and different values of $\phi$. A quadratic increase in storage modulus was found with increasing with $\phi$ above $\phi_0$=0.649 (FIG. 5C). To determine whether this this scaling relationship holds for samples made using the same continuous phase but prepared at different homogenization rates, $\omega$, G' was re-scaled from samples homogenized at $\omega$=4000 rpm and $\omega$=8000 rpm, multiplying G' by the corresponding mean droplet radius, a, and plotting them against the adjusted volume fraction, given by $\phi-\phi_0$. It was found that the two datasets collapse onto the same curve following a quadratic scaling approximately like $(\phi-\phi_0)^2$ (FIG. 5D). The same scaling strategy does not work when comparing emulsions prepared with continuous phases having different viscosities. It is hypothesized this result arises from the interfacial tension varying across samples having different continuous phases. Tests were therefore at constant $\phi$ and $\omega$, while varying $\eta$. The resulting plots of re-scaled modulus, G'a, versus $\eta$ exhibit an inverse relationship between the two (FIG. 5E). Since G' is a measure of energy storage and not dissipation, and a and $\phi$ have been accounted for, it is believed this result indicates the inverse relationship arises from different interfacial tensions exhibited by the different silicone oils with the aqueous droplets. Finally, a universal scaling law was found between the yield stress, $\sigma_y$ and elastic modulus G', given by $\sigma_y$=0.005(G')$^{1.36}$ for all emulsion samples made with varying volume fractions, homogenization rates, and continuous phase viscosities, showing good predictability of the macroscopic yielding behavior of these packed emulsions (FIG. 5F).

Refractive Index Matching

Figure 15:
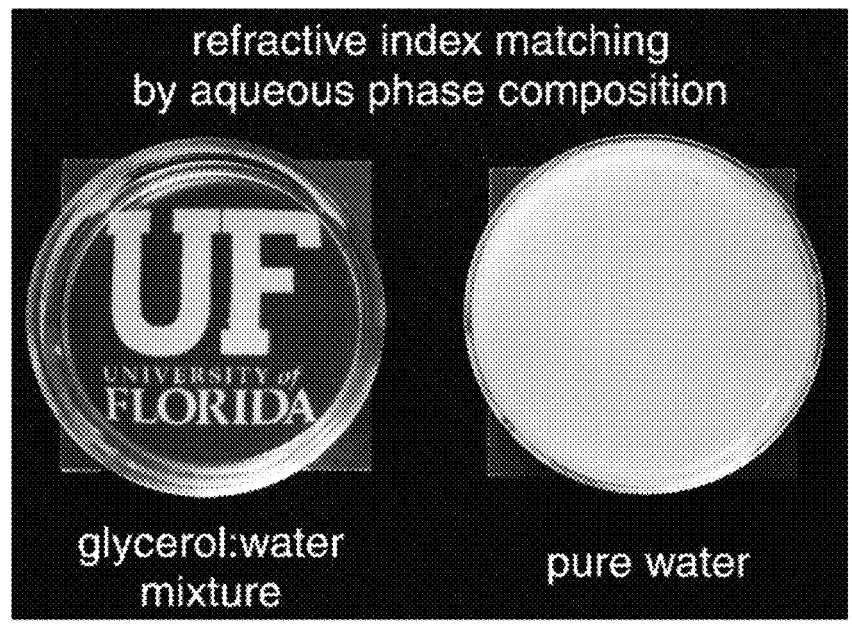
FIG. 15 shows optically clear emulsion formulations. To eliminate cloudiness that arises from the refractive index mismatch between the aqueous droplets and the silicone oil continuous phase (right), the droplets have been formulated from a mixture of water and glycerol at a composition that matches the refractive index of the silicone oil continuous phase; this formulation results in optically clear emulsions (left).

To effectively fabricate silicone structures and visualize the printing process using the disclosed technique, optically clear emulsions are needed. The refractive index (RI) mismatch between water (1.333) and silicone oil (1.399), results in extremely cloudy emulsions (FIG. 15). Glycerol was mixed into the aqueous phase at a final aqueous phase weight ratio of 48:52 of water and glycerol to match the RI between the two phases, resulting in optically clear emulsions.

Modeling Heart Valves

To 3D print a silicone heart valve representative of the human aortic heart valve, the print trajectory was modeled using a custom written MATLAB program. The native aortic valve geometric dimensions available from the literature were used to model the print trajectory. The trajectory was modeled in such a way that the aorta wall and the valve leaflets can be traced in a seamless spline path (FIG. 16), enabling us to fabricate a uniform-walled structure. Structural extensions were added on the top and the bottom of the model, to allow the cured structure to be clamped to fluid tubing during performance testing. The layer height of the model was set at 150 microns and the leaflets were spaced at 2 mm apart from each other; these values offer good layer-to-layer adhesion and provide a constant wall thickness throughout the structure. The designed print trajectory was rendered into a 3D model by converting the cloud points to a mesh using, MeshLab, an open-source software. This model was used to evaluate and compare the print trajectory and the print structure with the native aortic heart valve structure.

Stability of 3D Printed Features

Figure 17:
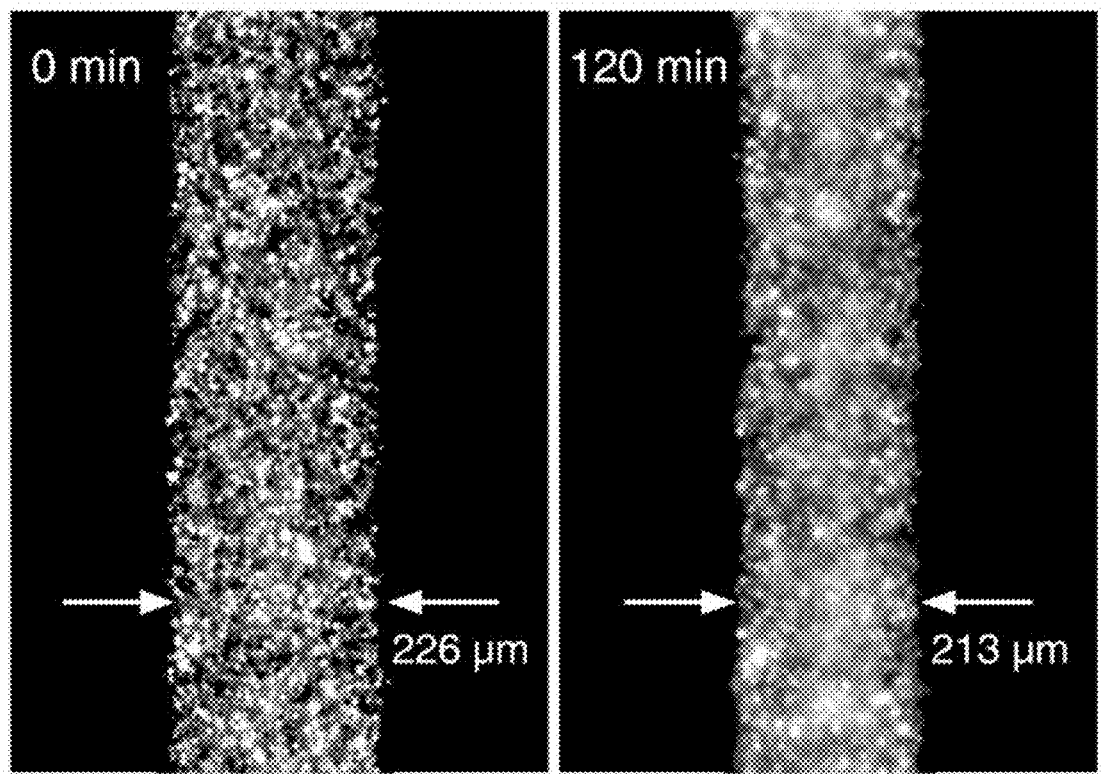
FIG. 17 shows feature stability measurements. To test the effect of ultra-low interfacial tension on the printed feature stability, linear PDMS features have been printed without curing agents and their stability has been analyzed with timelapse imaging. The feature is imaged using brightfield microscopy, process the image to remove background noise, and invert the intensity distribution. The feature width is estimated by using the same approach used in FIG. 12A. The printed feature is observed to be stable over a period of two hours, without any interfacial instability related breaks and with a negligible change in width due to the diffusion.

To measure the effect of ultra-low interfacial tension leveraged during the disclosed printing technique on the stability of the printed features, linear features are printed of Smooth-On Mold Max 10 PDMS formulation without any curing agent, and the feature width is analyzed over a period of 2 hours using timelapse imaging obtained through brightfield microscopy. The feature images are processed using the same protocol described in FIGS. 7A-7B and the measured feature diameter at the time of printing and two hours post-printing are compared (FIG. 17). The printed features are observed to be stable over time without interfacial instability-related breakups. The negligible decrease in the width of the printed feature is associated to the diffusion of low-viscous formulation components into the support medium; it is predicted this will be negated during fabrication process as the formulation will be allowed to cure.

Example 5: Discussion and Conclusions

To formulate a support medium for 3D printing with PDMS inks, inverse emulsions having silicone oil as the continuous phase were prepared, while varying the aqueous droplet packing fraction, $\phi$, and the average droplet radius, a, between samples; $\phi$ and a can be tuned independently to determine an emulsion's rheological properties and its corresponding performance as a printing support medium. Under conditions of ultra-low interfacial tension between the ink and the support medium, the droplet radius, a, is expected to strongly influence the printed feature roughness because the material interfaces will not spontaneously flatten. Thus, the smallest emulsion droplets that could be formulated formulate were chosen, and $\phi$ was chosen based on the emulsions' rheological properties. (FIGS. 14A-14C). The elastic shear modulus, G', and yield-stress, $\sigma_y$, of each formulation is measured with rheological tests (FIGS. 5A-5F). For the disclosed printing methods, an emulsion having $\sigma_y$=9 Pa and G'=320 Pa was chosen; the emulsion with these properties is weak enough to flow around a translating printing needle yet strong enough to support complex 3D printed structures. For all formulations, it was found that emulsions made from pure water droplets in silicone oil are extremely cloudy and inhibit visualizing the printing process. To make optically clear emulsions, the refractive indices of the two phases were matched by adding glycerol to the droplets, enabling the 3D printing process to be imaged at the macro-scale with photography and at the micro-scale using confocal fluorescence microscopy (CFM) (FIGS. 11D-11G and 15).

Figure 11A:
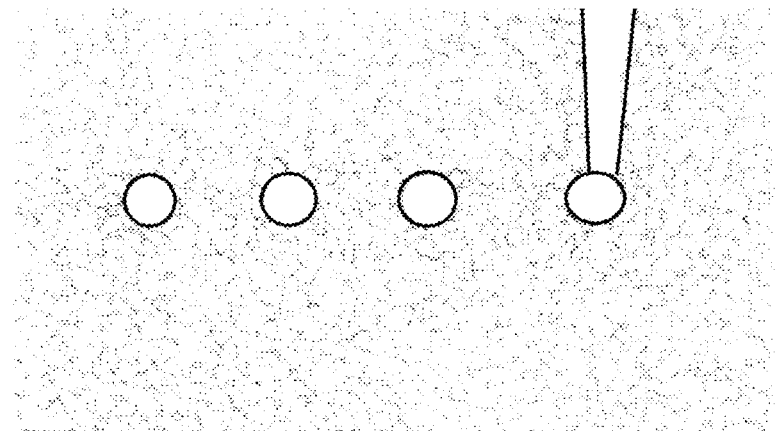
FIGS. 11A-11G show graphical representations of the role of interfacial tension between ink and support matrix.
Figure 11B:
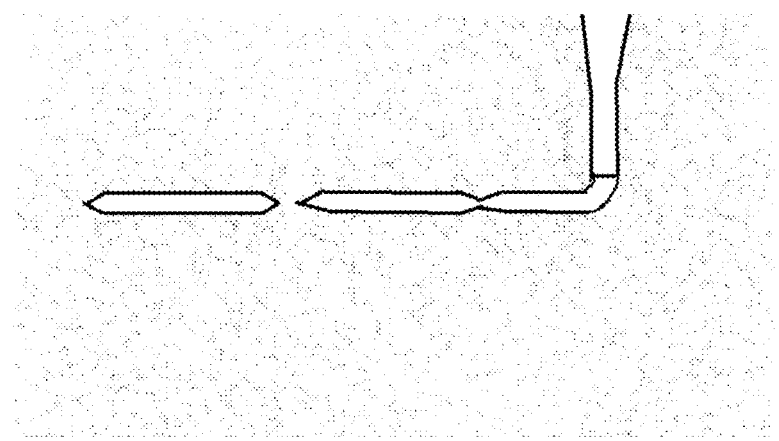
Figure 11C:
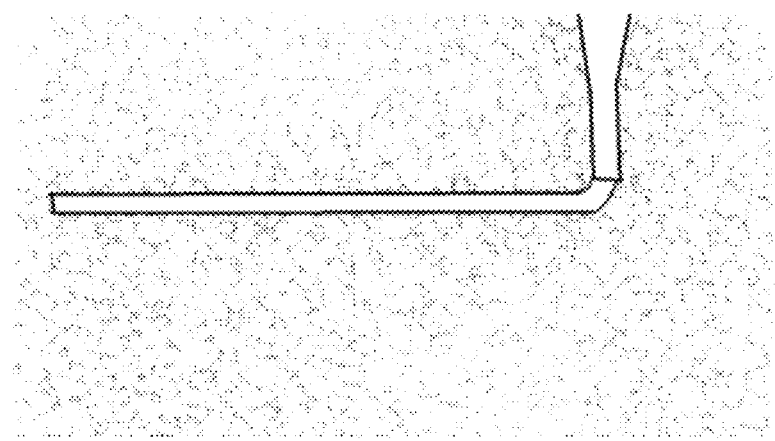
Figure 11D:
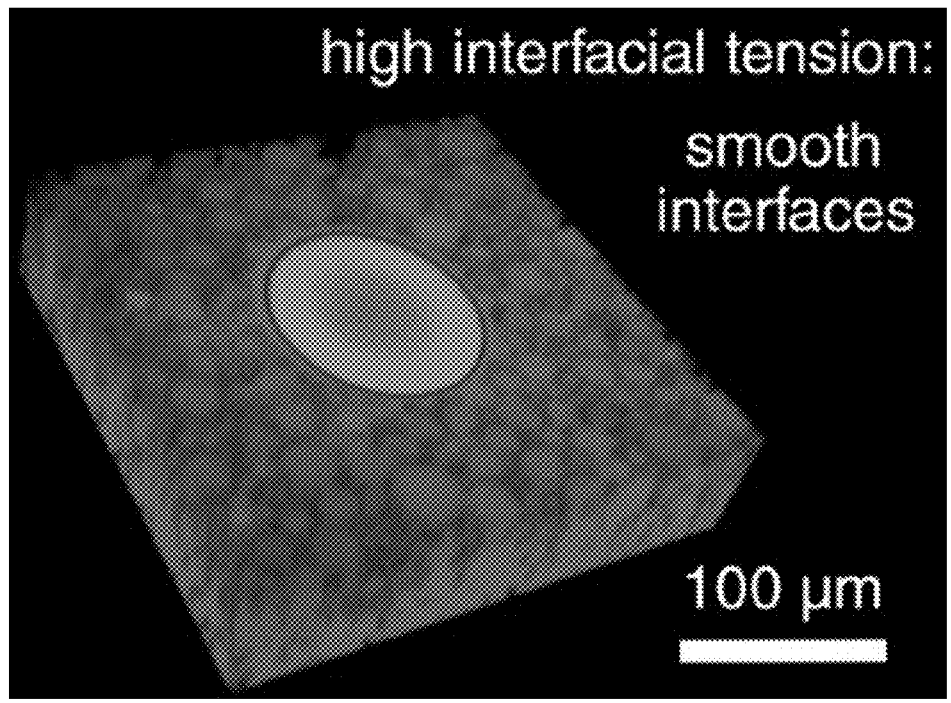
Figure 11E:
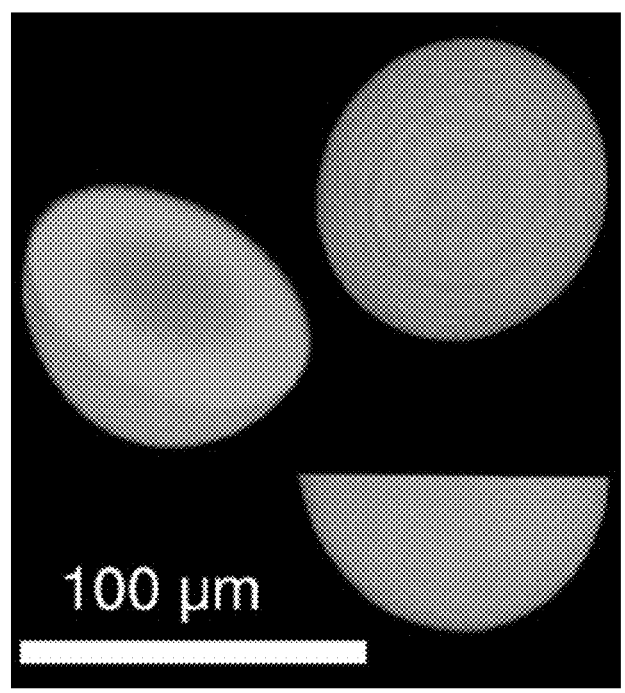
Figure 11F:
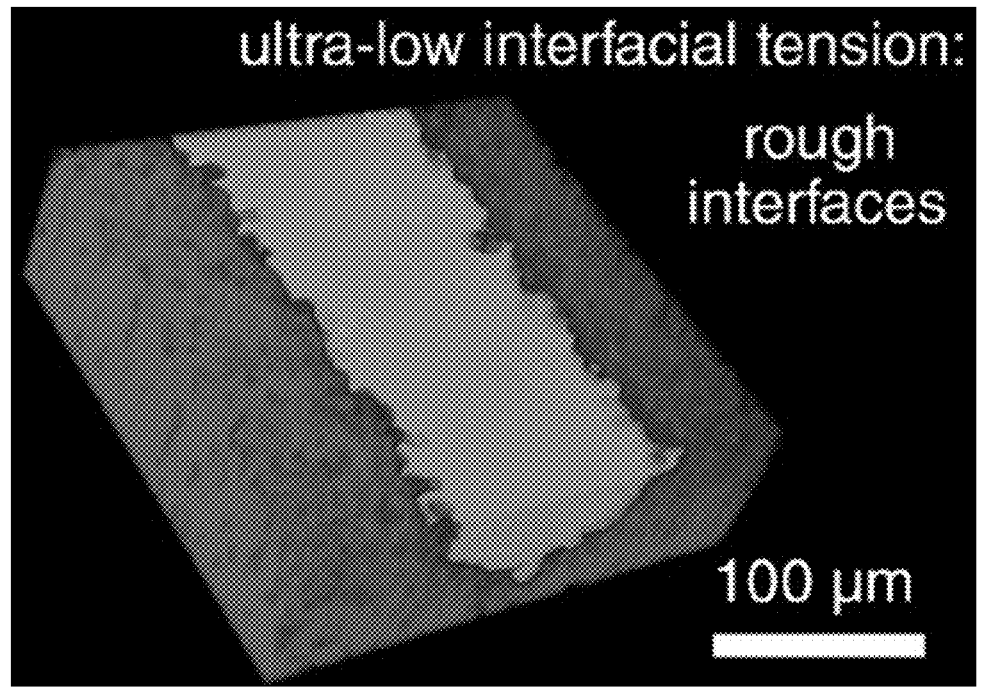
Figure 11G:
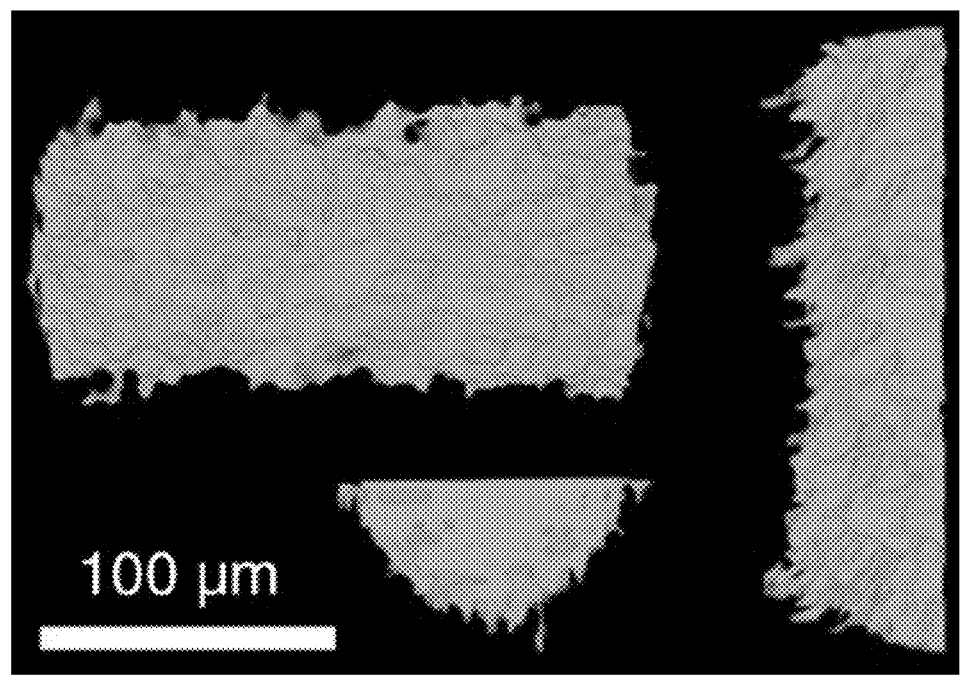

To test the role of interfacial tension in embedded 3D printing, the performance of the disclosed support medium was compared to an all-aqueous support medium made from packed hydrogel microparticles swollen in water. In both cases 3D print features were printed from a fluorescent PDMS liquid and the ink-support interfaces were imaged using CFM (Methods). The packed microgels are formulated to have $\sigma_y$=10 Pa and G'=550 Pa, comparable to those of the disclosed support material. From the 3D fluorescence images, it was found that printed silicone features break-up and form spherical droplets within the aqueous support. When printing a liquid ink into a packed granular support medium, the smallest stable feature has a diameter given by $d_{min}=2\gamma/\sigma_y$, where $\gamma$ is the interfacial tension between the ink and the support medium. For the aqueous medium, $\gamma$=25 mN/m, so $d_{min}$ is approximately 5 mm, more than 50 times the 100 μm diameter of the printed feature (FIGS. 11D-11E). Thus, the break-up of the feature into droplets is expected. By contrast, the 100 μm diameter silicone feature printed into the disclosed support material remains intact, indicating that $\gamma$<0.5 mN/m. To better estimate the interfacial tension between PDMS ink and the disclosed support medium, it was observed that the characteristic roughness length-scale at the feature surface is about one order of magnitude smaller than the feature diameter, indicating that $\gamma$<0.05 mN/m. These results indicate that the disclosed approach can potentially achieve features at least 500 times smaller than those achievable when printing PDMS into an aqueous support medium having the same material properties.

Figure 12A:
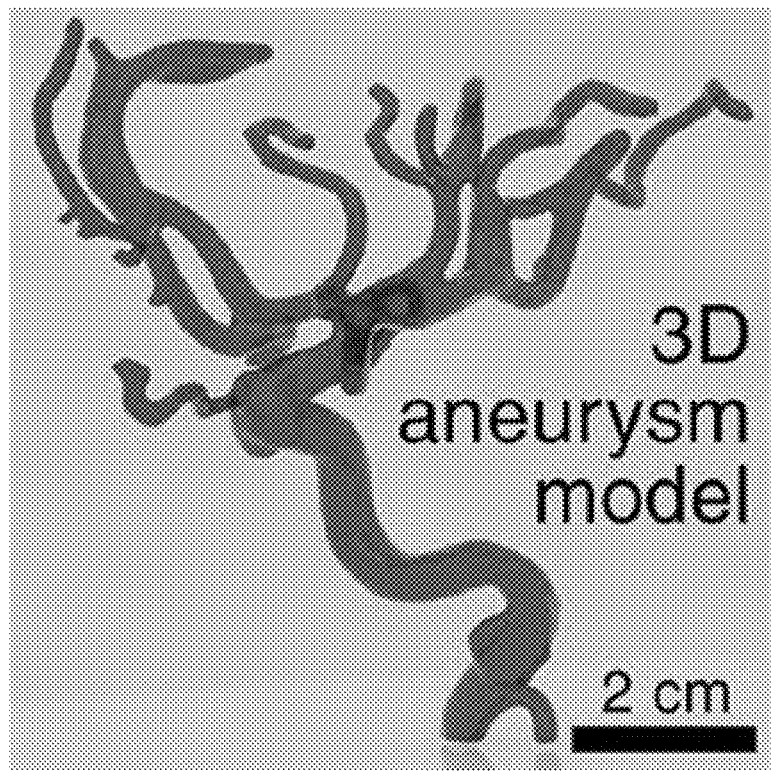
FIGS. 12A-12K show brain aneurysm and aortic heart valve models printed using the disclosed methods.
Figure 12B:
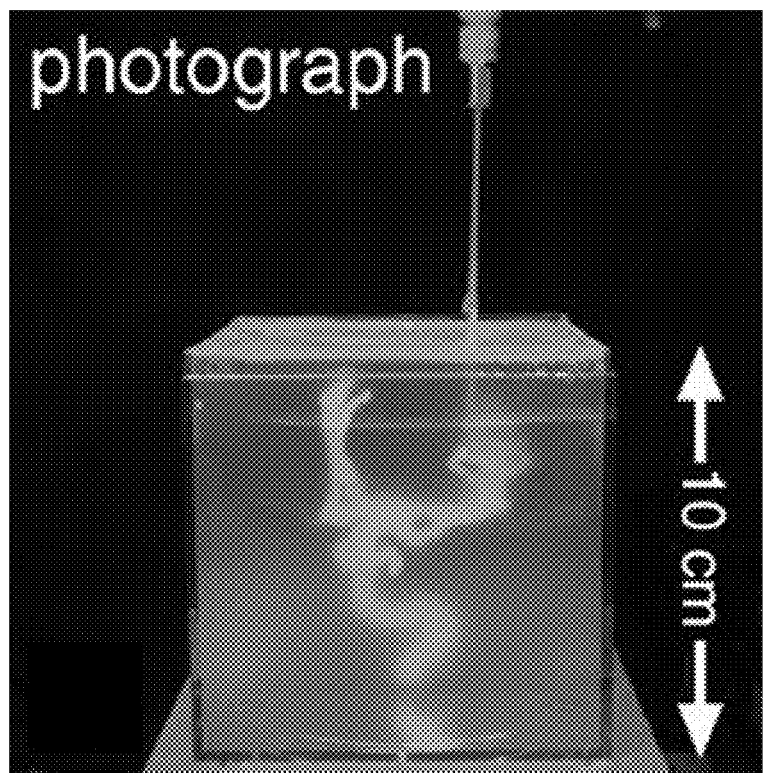
Figure 12C:
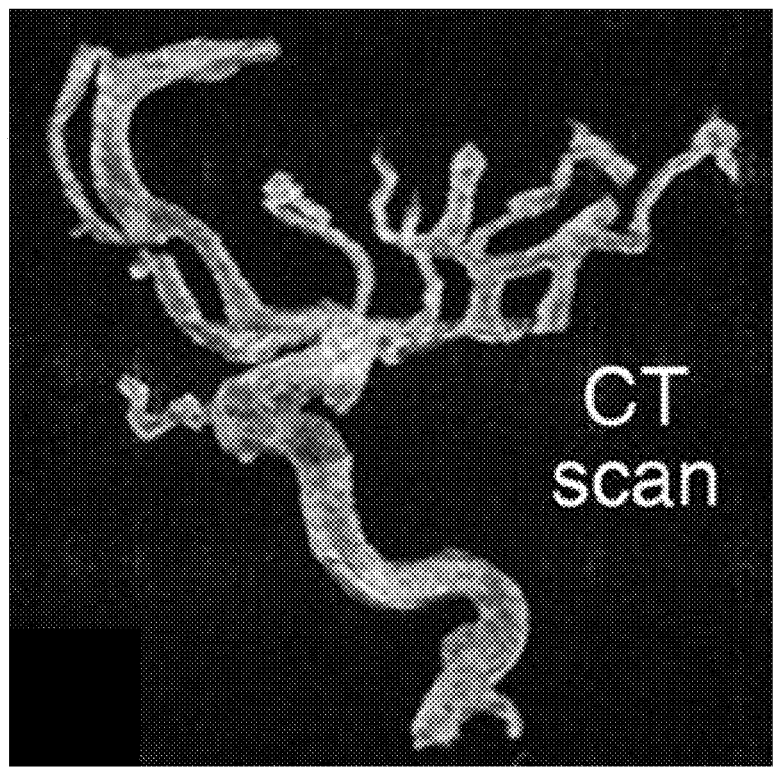
Figure 12D:
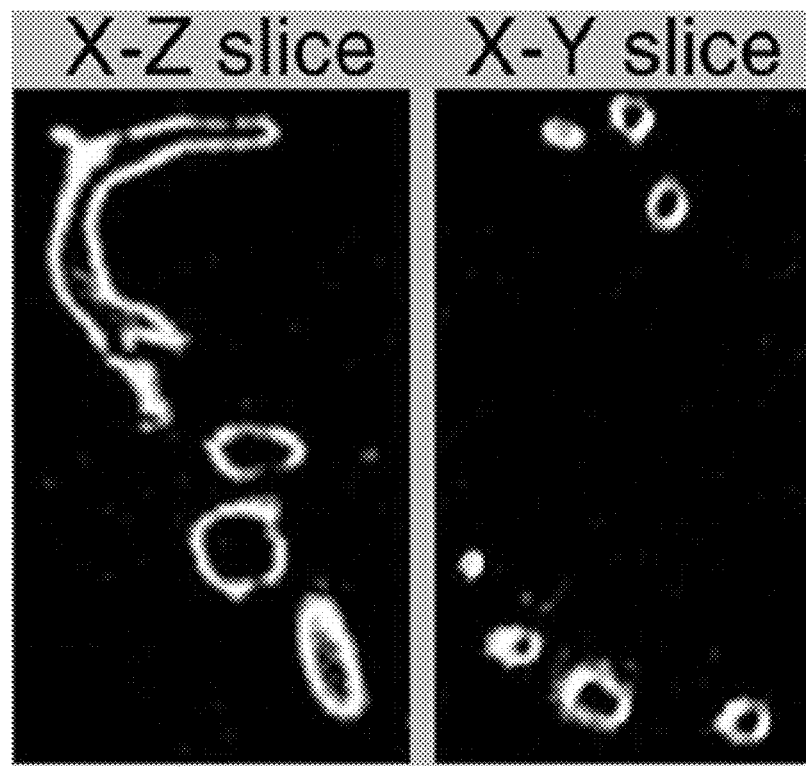
Figure 12E:
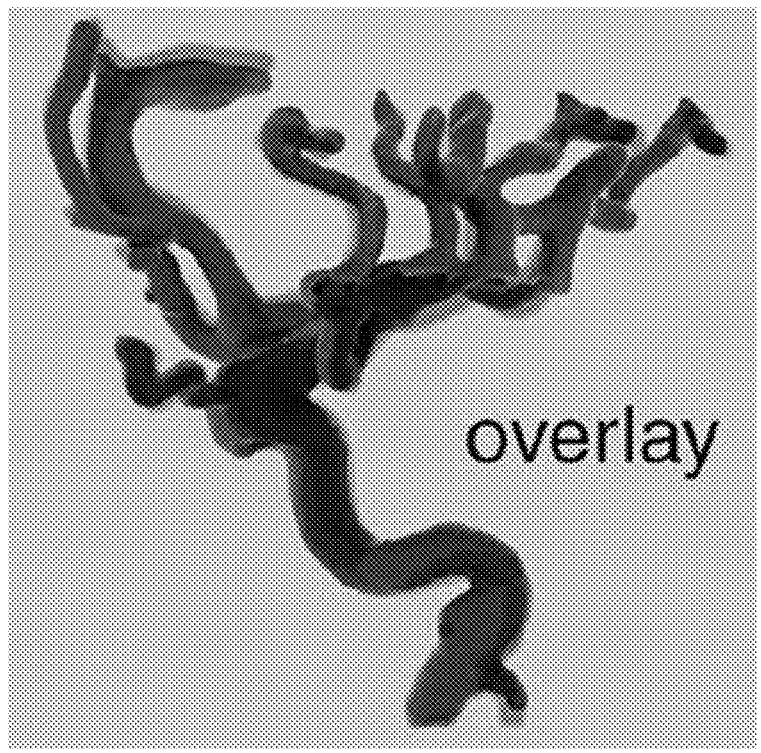
Figure 12F:
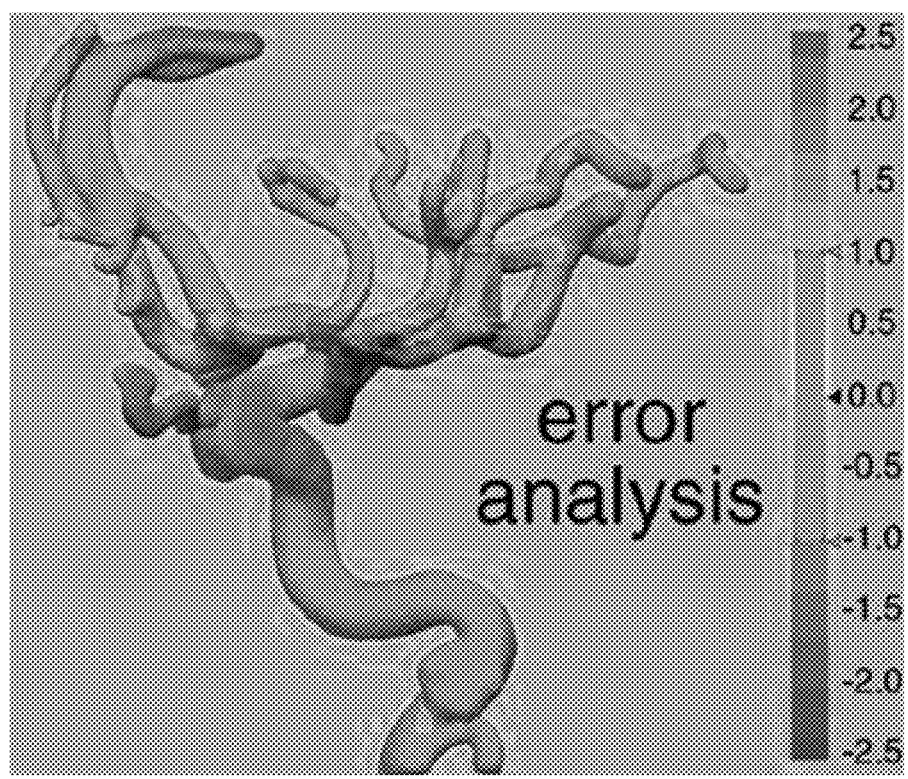

The dramatically reduced $\gamma$ and increased feature stability provided by the disclosed technique should enable printing of highly complex silicone structures. As a first test of this improved capability, a model brain aneurysm was printed; accurate silicone models of brain vasculature are needed because of the tremendous need for improved patient simulators for training neurosurgeons in cerebrovascular procedures. Current simulated tissues used in training provide unrealistic tactile feedback, lack small-diameter intracranial angioarchitecture, and often exclude the aortic arch and extracranial vascular anatomy that determine which specific catheters and instruments are used in each procedure. Employing realistic replicas of patients' brains during pre-surgery simulations would therefore reduce the incidence of errors in real surgical procedures. To create such a model, a 3D angiogram of a patient's brain aneurysm is collected using X-ray computed tomography (XRCT). The 3D scan is segmented and processed to create a series of 3D printing trajectories (FIG. 12A). Here Gelest ExSil-100 silicone pre-elastomer is used, which can be formulated to have material properties that mimic a wide range of tissues. A snapshot from a video of the printing process demonstrates how the translating needle easily flows through the jammed emulsion, which traps the deposited silicone in place (FIG. 12B). The printed structure is cured at 600 C for 24 hours, then imaged with XRCT (FIG. 12C). Horizontal and vertical slices through the 3D scan reveal that the highly branched and complex printed network of vessels is hollow, having an average wall thickness of approximately 400 μm (FIG. 12D). The CT scan of the printed structure is used to create a 3D model for quantitative comparison to the original angiogram. The registration between the patient-derived model and the printed model is excellent; 68% of the printed surface locations lie within 500 μm from their programmed locations and 95% lie within 1 mm (FIGS. 12E-12F). With this approach, 3D patient-specific models can be printed directly into surgical simulators in which instruments can be inserted through ports in the printing container, allowing surgeons to simulate the surgical procedures with or without the aid of visual feedback.

Figure 12G:
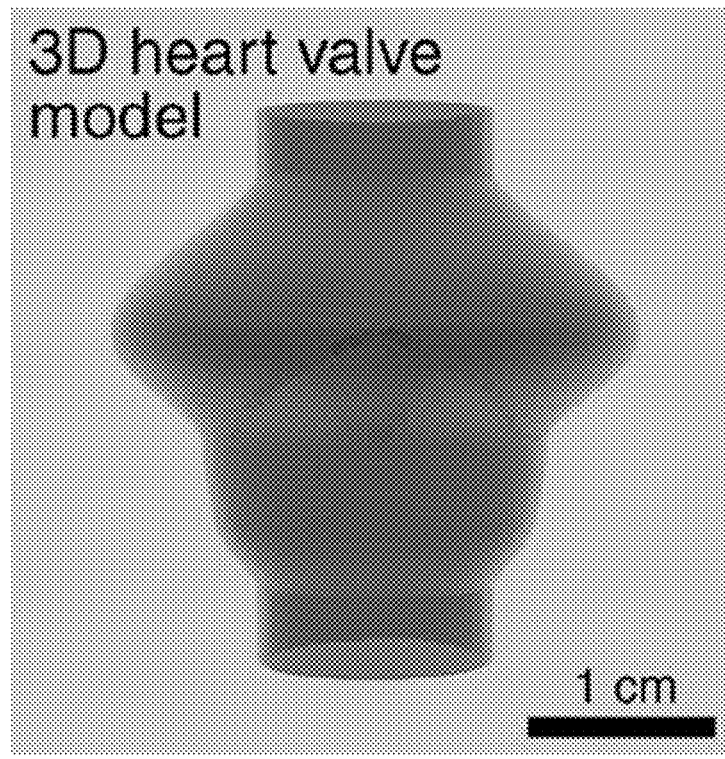
Figure 12H:
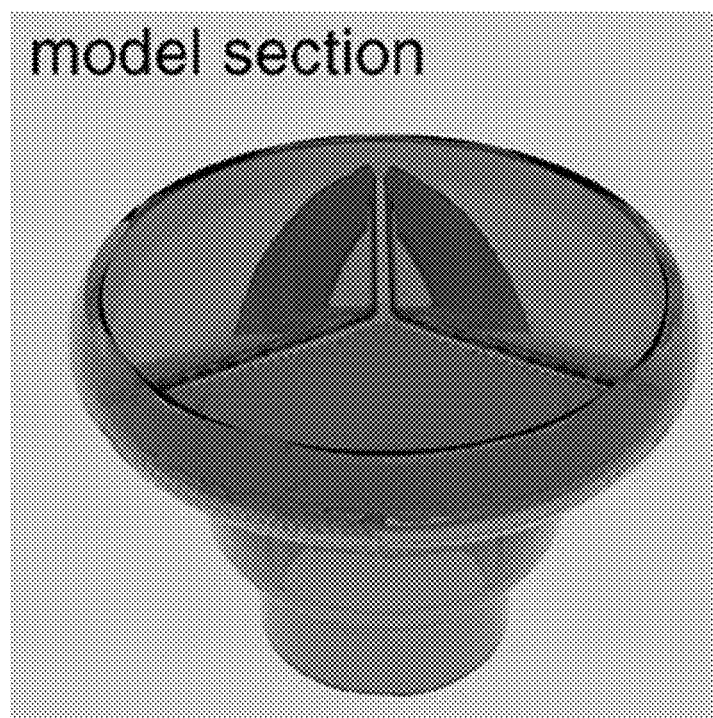
Figure 12I:
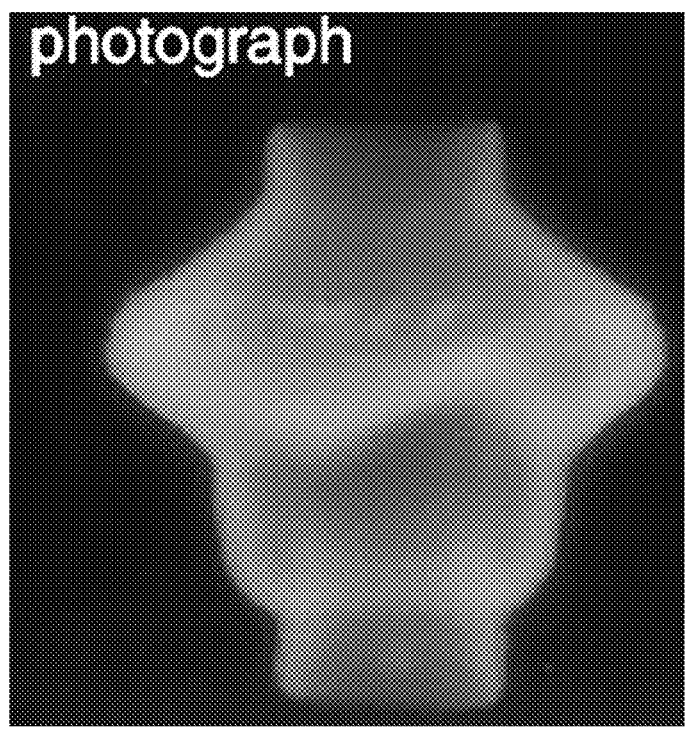
Figure 12J:
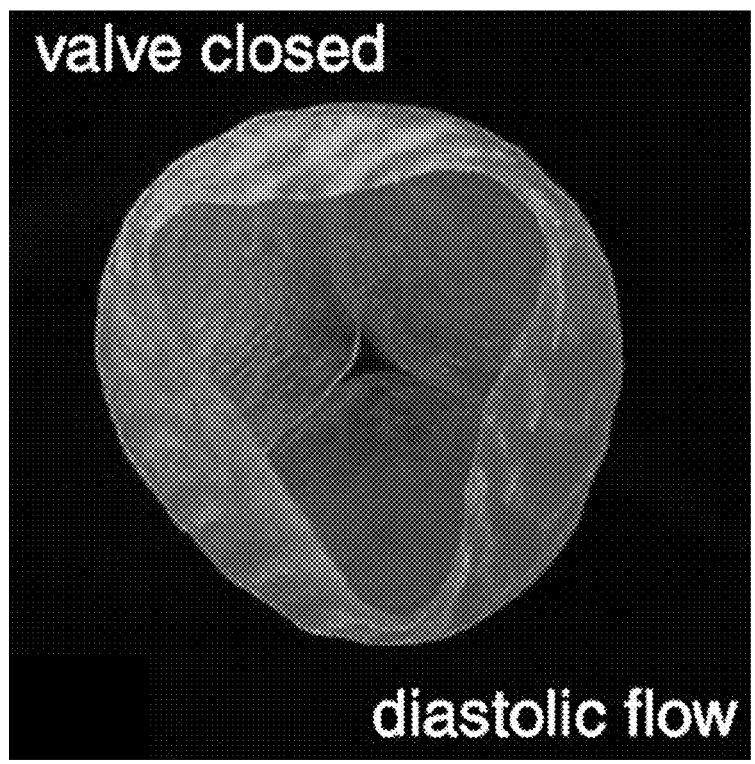
Figure 12K:
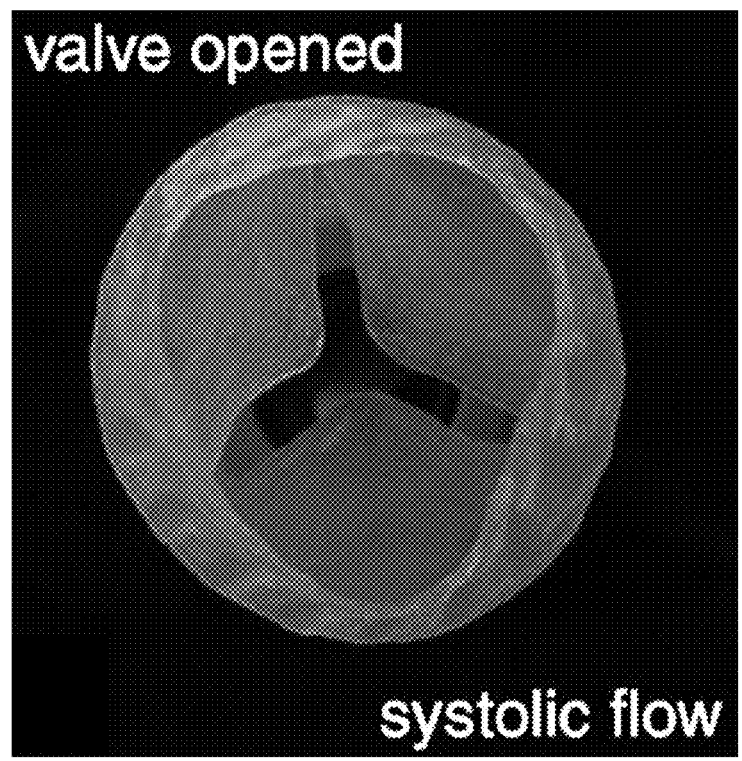

The ability to accurately model brain vasculature raises the question of whether such fine structures can be manufactured to be both highly compliant and physically robust. The artificial aortic heart valve represents a class of devices with such requirements. Native aortic heart valves are subject to dynamic mechanical loads during the cardiac cycle. Prosthetic replacement is widely used to treat aortic valve failure, yet the predominantly used mechanical valves and allogenic or xenogeneic tissue valve replacements often result in mechanical failure, hemolysis, blood coagulation, or structural degradation due to calcification. A potential alternative is the artificial silicone valve prosthesis; silicone is established in vascular applications because of its hemocompatibility and durability. Leveraging the disclosed 3D printing method, the intricate semilunar shape of the thin aortic leaflets can be replicated in manufactured silicone valves. A model heart valve was designed based on physiologically representative dimensions of the different valve components (FIGS. 12G-12H and 16). A UV curable silicone formulation, Momentive UV Electro-225, was used as the ink and print it into the disclosed support material (FIG. 12I). To create highly flexible leaflets, the structure was printed by translating the needle tip at a speed of 2 mm/sec and depositing material at a rate of 125 μL/hr, producing features approximately 150 μm in diameter. Correspondingly, a layer-spacing of 100 microns was chosen for good layer adhesion. The printed model is then UV cured, removed from the disclosed material, washed with detergent, and rinsed in DI water (Methods). The cured part has a final wall thickness of approximately 250 μm. Despite having very thin, flexible walls, the model valves are physically robust enough to connect to pipe fittings and simulate transvalvular blood flow by cyclic pumping of water. During the negative flow of the pulse representing the diastolic cycle, the valves were observed to remain closed with very little deflection on the thin leaflets (FIG. 12J), and during the positive pulse corresponding to the systolic cycle, the leaflets deflect, opening the valve and letting the water flow (FIG. 12K).

Figure 7B:
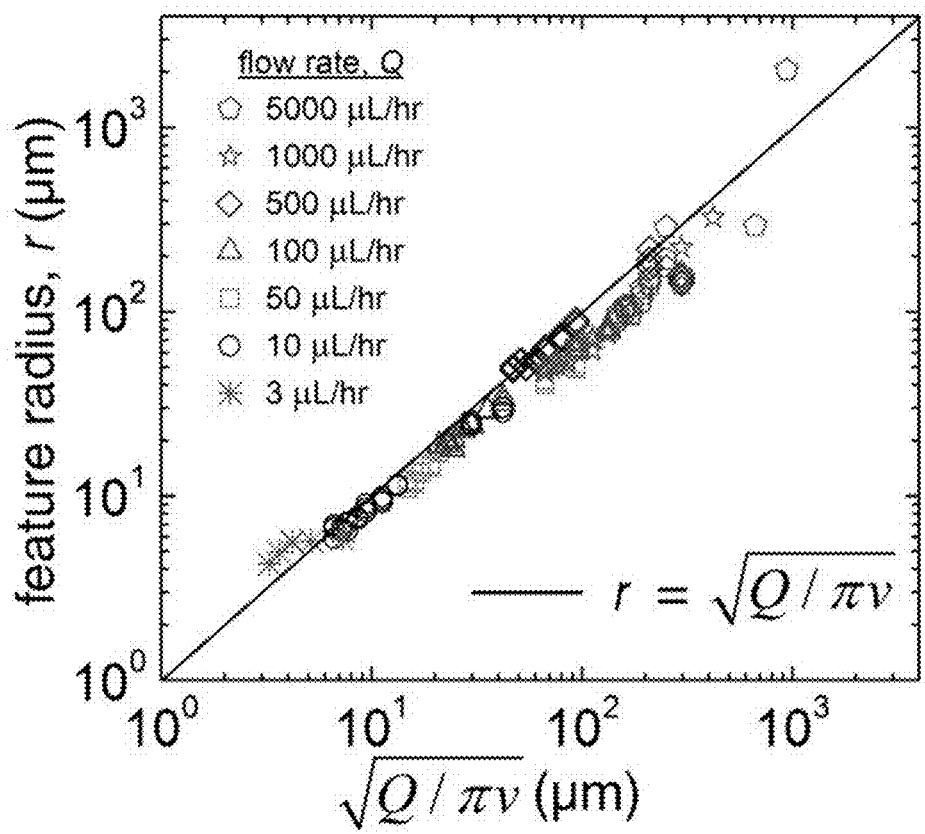

The wall thicknesses of the brain vasculature and heart valve models are set by a combination of feature radius and layer spacing. The feature radius, r, for different prints can be chosen by selecting a combination of nozzle translation speed, v, and material deposition rate, Q. To systematically explore how well r can be predicted using the disclosed technique, a series of linear features were printed using the Smooth-On Mold Max 10 PDMS formulation at different combinations of v and Q, then measure r (FIG. 7A). From basic fluid continuity, the relationship between r, Q, and v, given by $\pi r^2 = Q/v$ was predicted. Performing many experiments at different combinations of Q and v, it was found that this prediction matches the measured feature radius very well with no adjustable parameters (FIG. 7B). These printed features are stable over time; the change in measured feature size over the course of 120 minutes post-printing is found to be negligible (FIG. 17). Stable silicone features can be fabricated as small as 4 μm in radius using the disclosed printing technique; the smallest stable feature radius previously demonstrated was 40 μm.

It has been shown that highly controlled 3D printing with PDMS is possible with the disclosed printing technique, and the functionality of the heart valve model suggests that the structures may be sufficiently compliant and durable for use in applications. To test the mechanical performance of printed silicone structures, tensile specimens are fabricated using PlastSil-71 RTV silicone formulation following ASTM D412 Type C specifications. To test the role of layer-to-layer adhesion in their mechanical integrity, the tensile samples are printed with their extruded features oriented both in the longitudinal and lateral directions with respect to the long-axis of the specimen geometry. The printed structures are cured at 600° C. for 4 hours and then tested using an Instron 5943 instrument at a loading rate of 500 mm/min (FIGS. 13A-13B). The tensile stress-strain data show that both the lateral and longitudinal print specimens differ negligibly from one another and have the same elastic modulus of 28 kPa (FIG. 13C). All printed specimens exhibit linear stress-strain relationships at low strain levels and repeatable stress-strain curves at higher strains, failing at strains greater than 1000%. Comparing these results to the performance of molded specimens, it was found that all stress-strain curves have the same shape, yet printed structures fail at higher strains than molded structures while molded structures exhibit elastic moduli approximately twice those of printed structures. This softening effect could arise from systematic heterogeneities in the printed structures inherent to the 3D printing process.

As a final assessment of the quality of structures fabricated with the disclosed printing technique, the surface finish of fabricated parts was investigated. The ultra-low interfacial tension between the silicone and the disclosed support material is expected to produce micro-rough surface on the printed shapes. Using laser confocal microscopy, a segment of the heart valve model immersed in a rhodamine solution was imaged, visualizing and quantifying the surface roughness in 3D. The RMS roughness was found to be 6.54±0.95 μm (mean and standard error) which is comparable to the average emulsion droplet radius. This value is also comparable to the roughness of PDMS structures printed into support materials having a high interfacial tension against silicone inks. Thus, eliminating disruptive interfacial driving forces with the disclosed technique enables precise silicone printing without reducing surface quality or mechanical performance of fabricated structures.

The disclosed 3D printing method introduced here eliminates the disruptive effects of interfacial tension between printed inks and their support materials. These results show that the disclosed printing method can produce fine features to make precise, smooth, strong, and functional devices from commercially available PDMS formulations. The versatility of the disclosed technique eliminates the need to formulate specialized PDMS inks for 3D applications, broadening the toolbox for researchers and industrial manufacturers seeking to 3D print PDMS-based devices while improving upon previous silicone printing methods. The disclosed strategy hinges on formulating support materials that are chemically similar to the inks they support—PDMS inks printed into a continuum of PDMS oil in this case, though the same principle could be employed with aqueous polymers. Despite the chemical similarity between the ink and the support medium, intermixing was not observed between the two materials that interfered with printing quality. The fundamental interfacial physics of this apparent stability needs further exploration. It is believed that an effective interfacial tension or a form of liquid-liquid phase separation may stabilize the interfaces, likely influenced by the jammed emulsion phase. In the near-term, the disclosed method is envisioned to be useful in 3D printing for a wide range of applications, beyond silicone-based devices, given the diversity and availability of polymer systems and the simplicity of formulating suitable support materials.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES

1. Balcells M. et al., Smooth muscle cells orchestrate the endothelial cell response to flow and injury. Circulation 121, 2192-2199 (2010).
2. Bhattacharjee T, et al (2015) Writing in the granular gel medium. Science Advances, 1(8): e1500655-e1500655.
3. Bhattacharjee T, et al (2016) Liquid-like Solids Support Cells in 3D. ACS Biomater. Sci. Eng., 2(10):1787-1795.
4. Bhattacharjee T, et al (2018) Polyelectrolyte scaling laws for microgel yielding near jamming. Soft Matter, 14(9): 1559-1570.
5. Bi D, et al (2011) Jamming by shear. Nature, 480(7377): 355-358.
6. Bosi S, et al (2015) From 2D to 3D: Novel nanostructured scaffolds to investigate signalling in reconstructed neuronal networks. Scientific Reports, 5:9562.
7. Brangwynne C P, et al (2015) Polymer physics of intracellular phase transitions. Nature Physics, 11(11):899-904.
8. Cates M E, et al (1998) Jamming, force chains, and fragile matter. Physical Review Letters, 81(9):1841-1844.
9. Conley G M, et al (2017) Jamming and overpacking fuzzy microgels: Deformation, interpenetration, and compression. Science Advances, 3(10): e1700969.
10. Corwin El, et al (2005) Structural signature of jamming in granular media. Nature, 435(7045):1075-1078.
11. Coulter, F. B. et al., Bioinspired Heart Valve Prosthesis Made by Silicone Additive Manufacturing. Matter 1, 266-279 (2019).
12. Dufresne E R, et al (2009) Self-assembly of amorphous biophotonic nanostructures by phase separation. Soft Matter, 5(9):1792-1795.
13. Femmer T, et al Print your own membrane: Direct rapid prototyping of polydimethylsiloxane. Lab Chip, 14:2610-2613.
14. Ghriallais, R. N. et al, Comparison of in vitro human endothelial cell response to self-expanding stent deployment in a straight and curved peripheral artery simulator. Journal of The Royal Society Interface 10, 20120965 (2013).
15. Grosberg A, et al (2011) Ensembles of engineered cardiac tissues for physiological and pharmacological study: Heart on a chip. Lab on a Chip, 11(24):4165-4173.
16. Gutowski, I. A. et al, Scaling and mesostructure of Carbopol dispersions. Rheologica acta 51, 441-450 (2012).
17. Hinton T J, et al (2016) 3D Printing PDMS Elastomer in a Hydrophilic Support Bath via Freeform Reversible Embedding. ACS Biomaterials Science and Engineering, 2(10):1781-1786.
18. Ho C M B, et al (2015) 3D printed microfluidics for biological applications. Lab on a Chip, 15(18):3627-3637.
19. Horiuchi H, et al (1991) Molecular weight dependence of the cloud-point curve of poly(dimethylsiloxane)/poly (methylethylsiloxane) mixtures. Polymer, 32(11):1970-1974.
20. Huh D, et al (2012) Microengineered physiological biomimicry: Organs-on-Chips. Lab on a Chip, 12(12): 2156-2164.
21. Kolesky D B, et al (2016) Three-dimensional bioprinting of thick vascularized tissues. Proc. of the National Academy of Sciences of the United States of America, 113 (12):3179-3184.
22. Krause S (1978) Chapter 2—Polymer-Polymer Compatibility. Polymer Blends: 15-113.
23. Krause S (1986) Polymer-polymer miscibility. Pure and Applied Chemistry, 58(12)
24. Kuo C M, et al (1992) Investigation of the Interactions and Phase Behavior in Poly(dimethylsiloxane) and Poly (methylphenylsiloxane) Blends. Macromolecules, 25(8): 2192-2195.
25. Kuo C M, et al (1993) The effects of end-groups on the critical miscibility temperatures and thermodynamic interactions in poly(dimethylsiloxane) and poly(methylphenylsiloxane) blends. European Polymer Journal, 29(5):661-664.
26. Kuo C M, et al (1994) Studies of cyclic and linear poly(dimethylsiloxane)s: 31. Effect of molecular architecture/topology on blends of poly(methylphenylsiloxane) and poly(dimethylsiloxane). Polymer, 35(21): 4623-4626.
27. Liravi, F. et al, Additive manufacturing of silicone structures: A review and prospective. Additive Manufacturing 24, 232-242 (2018).
28. Liu A J, et al (1998) Jamming is not just cool any more. Nature, 396(6706):21-22.
29. Lo H Y, et al (2019) Diffusion-Dominated Pinch-Off of Ultralow Surface Tension Fluids.
30. Luo G, et al (2019) Freeform, Reconfigurable Embedded Printing of All-Aqueous 3D Architectures. Advanced Materials, 31(49):1-7.
31. Martorell, J. et al., Extent of flow recirculation governs expression of atherosclerotic and thrombotic biomarkers in arterial bifurcations. Cardiovascular research 103, 37-46 (2014).
32. Mason, T. et al, Elasticity of compressed emulsions. Physical review letters 75, 2051 (1995).
33. Mata A, et al (2009) A three-dimensional scaffold with precise micro-architecture and surface micro-textures. Biomaterials, 30(27):4610-4617.
34. Mattsson J, et al (2009) Soft colloids make strong glasses. Nature, 462(7269):83-86.
35. Mehrabian H, et al Capillary breakup of a liquid torus. J. Fluid Mech., 717:281-292.
36. Menut P, et al (2012) Does size matter? Elasticity of compressed suspensions of colloidal—and granular-scale microgels. Soft Matter, 8(1):156-164.
37. Menut, P. et al, Does size matter? Elasticity of compressed suspensions of colloidal—and granular-scale microgels. Soft Matter 8, 156-164 (2012).

38. Mohan, L. et al, Local mobility and microstructure in periodically sheared soft particle glasses and their connection to macroscopic rheology. Journal of Rheology 57, 1023-1046 (2013).
39. Moretto, H-H et al., in Ullmann's Encyclopedia of Industrial Chemistry.
40. Murphy S V., et al (2014) 3D bioprinting of tissues and organs. Nature Biotechnology, 32(8):773-785.
41. Nathan, A. et al., Flexible electronics: the next ubiquitous platform. Proceedings of the IEEE 100, 1486-1517 (2012).
42. O'Bryan C S, et al (2017) Self-assembled micro-organogels for 3D printing silicone structures. Science Advances, 3(5).
43. O'Hern C S, et al Jamming at zero temperature and zero applied stress: The epitome of disorder. Phys. Rev. E, 68:011306.
44. O'Bryan, C. S. et al, Capillary forces drive buckling, plastic deformation, and break-up of 3D printed beams. Soft Matter 17, 3886-3894 (2021).
45. Odom T W, et al (2002) Improved pattern transfer in soft lithography using composite stamps. Langmuir, 18(13): 5314-5320.
46. Olabisi O, et al (1979) Polymer-Polymer Miscibility. https://doi.org/10.13140/2.1.2644.3206
47. Ovarlez, G. et al, Three-dimensional jamming and flows of soft glassy materials. Nature materials 9, 115-119 (2010).
48. Ozbolat V, et al (2018) 3D Printing of PDMS Improves Its Mechanical and Cell Adhesion Properties. ACS Biomaterials Science and Engineering, 4(2):682-693.
49. Pairam E, et al Stability of toroidal droplets inside yield stress materials. Phys. Rev. E, 90:021002.
50. Pellet, C. et al, The glass and jamming transitions of soft polyelectrolyte microgel suspensions. Soft matter 12, 3710-3720 (2016).
51. Punchard, M. A. et al., Evaluation of human endothelial cells post stent deployment in a cardiovascular simulator in vitro. Annals of biomedical engineering 37, 1322-1330 (2009).
52. Qin D, et al (2010) Soft lithography for micro- and nanoscale patterning. Nature Protocols, 5(3):491-502.
53. Rahimi, A. et al, Review on rubbers in medicine: natural, silicone and polyurethane rubbers. Plastics, rubber and composites 42, 223-230 (2013).
54. Romeo, G. et al, Elasticity of compressed microgel suspensions. Soft Matter 9, 5401-5406 (2013).
55. Rosowski K A, et al (2020) Elastic ripening and inhibition of liquid-liquid phase separation. Nature Physics, 16:422-425.
56. Rouleau, L. et al, The response of human aortic endothelial cells in a stenotic hemodynamic environment: effect of duration, magnitude, and spatial gradients in wall shear stress. Journal of biomechanical engineering 132, (2010).
57. Ruan, X. et al., Emerging Applications of Additive Manufacturing in Biosensors and Bioanalytical Devices. Advanced Materials Technologies 5, 2000171 (2020).
58. Schweizer K S, et al Collisions, caging, thermodynamics, and jamming in the barrier hopping theory of glassy hard sphere fluids. The Journal of Chemical Physics, 127(16):164505-164505.
59. Scullen, T. et al, Commentary: Design and Physical Properties of 3-Dimensional Printed Models Used for Neurointervention: A Systematic Review of the Literature. Neurosurgery 87, E454-e455 (2020).
60. Sessoms, D. A. et al Multiple dynamic regimes in concentrated microgel systems. Philosophical Transactions of the Royal Society A: Mathematical, Physical and Engineering Sciences 367, 5013-5032 (2009).
61. Seth, J. R. et al, A micromechanical model to predict the flow of soft particle glasses. Nature materials 10, 838-843 (2011).
62. Shao H, et al (2017) 3D gel-printing of zirconia ceramic parts. Ceramics International, 43(16):13938-13942.
63. Shen Y, et al (2017) 3D printing of large, complex metallic glass structures. Materials and Design, 117:213-222.
64. Silicone Market Trends | Industry Growth Analysis Report, 2019-2025. <https://www.grandviewresearch.com/industry-analysis/silicone-market> Accessed Nov. 10, 2022.
65. Style R W, et al (2018) Liquid-Liquid Phase Separation in an Elastic Network. Physical Review X, 8(1) 011028
66. Sun, W. et al, Computational modeling of cardiac valve function and intervention. Annual review of biomedical engineering 16, 53-76 (2014).
67. Tumbleston J R, et al (2015) Continuous liquid interface production of 3D objects. Science, 347(6228):1349-1352.
68. Vonnegut B (1942) Rotating bubble method for the determination of surface and interfacial tensions. Review of Scientific Instruments, 13(1):6-9.
69. Waqas, M. et al., Design and Physical Properties of 3-Dimensional Printed Models Used for Neurointervention: A Systematic Review of the Literature. Neurosurgery 87, E445-e453 (2020).
70. Wen Q, et al (2011) Polymer physics of the cytoskeleton. Current Opinion in Solid State and Materials Science, 15(5):177-182.
71. Xia Y, et al (1998) SOFT LITHOGRAPHY. Annual Rev. of Materials Science, 28(1):153-184.
72. Yirmibesoglu, O. D. et al., in 2018 IEEE International Conference on Soft Robotics (RoboSoft). (IEEE, 2018), pp. 295-302.

What is claimed is:

1. A support material for 3D printing of soft material, the support material consisting of an inverse emulsion and, optionally, a surfactant, wherein the inverse emulsion consists of a continuous phase consisting of a silicone oil and a dispersed phase consisting of water, glycerol, or any combination thereof;
   wherein the silicone oil consists of poly(dimethylsiloxane) or a weight fraction of from about 0.1 to about 0.9 poly(dimethylsiloxane) and a weight fraction of from about 0.1 to about 0.9 poly(methylphenylsiloxane).

2. The support material of claim 1, wherein the soft material comprises silicone.

3. The support material of claim 1, wherein the silicone oil comprises a viscosity of from about 5 cSt to about 1000 cSt.

4. The support material of claim 1, wherein the dispersed phase and the continuous phase comprise matching refractive indices, and wherein the support material is optically clear.

5. The support material of claim 1, wherein the inverse emulsion comprises a volume fraction of the dispersed phase of from about 0.64 to about 0.85.

6. The support material of claim 1, wherein the surfactant is selected from the group consisting of cyclopentasiloxane and dimethicone copolyol, dimethicone and dimethicone copolyol, lauryl methicone copolyol, dimethicone copolylol, dimethicone copolyol and at least one C10-C16 isoparaffin, cyclopentasiloxane and dimethicone copolyol crosspolymer, alkyl dimethicone copolyol, a silicone glycerol emulsifier, or a combination thereof.

7. The support material of claim 1, wherein the inverse emulsion comprises a yield stress of from about 0.1 to about 100 Pa.

8. A method for 3D printing soft matter, the method comprising injecting an ink into the support material of claim 1.

9. The method of claim 8, wherein the ink comprises poly(dimethylsiloxane) or poly(methylphenylsiloxane).

10. The method of claim 8, wherein the ink is UV-curable.

11. The method of claim 8, wherein the ink is injected into the support material with a deposition rate of from about 10 to about 10,000 μL/h.

12. The method of claim 8, wherein the ink is injected into the support material with a translational velocity of from about 0.01 to about 20 mm/s.

13. The method of claim 8, wherein interfacial tension between the support material and the ink is from about 0.1 mN/m to about 10 mN/m.

14. An article comprising soft matter produced by the method of claim 8.

15. The article of claim 14, wherein the soft matter comprises a minimum stable feature size of from about 4 to about 80 μm.

16. The article of claim 14, wherein the soft matter comprises a minimum stable feature size of from about 4 to about 80 μm.

17. The article of any of claim 14, wherein the article comprises a model organ or portion thereof, a heart valve, an ear fitting for a hearing aid, a nasal fitting for a respiratory aid, a nasal fitting for a sleep apnea device, a custom vasculature implant, or a custom ostomy seal.

18. The support material of claim 1, wherein the support material becomes temporarily fluidized at a location of a moving injection nozzle in the support material, when the moving injection nozzle follows a 3D path through the support material to create a 3D printed structure.

\* \* \* \* \*